(12) United States Patent  
Peterson

(10) Patent No.: US 7,889,678 B2
(45) Date of Patent: Feb. 15, 2011

(54) SYSTEMS AND METHODS FOR CONNECTING NETWORKED DEVICES

(75) Inventor: Brian Peterson, Cypress, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 701 days.

(21) Appl. No.: 11/617,520

(22) Filed: Dec. 28, 2006

(65) Prior Publication Data

US 2007/0217426 A1 Sep. 20, 2007

Related U.S. Application Data

(60) Provisional application No. 60/754,857, filed on Dec. 28, 2005.

(51) Int. Cl.
*H04L 12/28* (2006.01)
(52) U.S. Cl. .................................. 370/254
(58) Field of Classification Search .............. 370/254
See application file for complete search history.

(56) References Cited

U.S. PATENT DOCUMENTS 6,930,730 B2 * 8/2005 Maxon et al. ............... 348/734

2002/0124262 A1 * 9/2002 Basso et al. ................. 725/109
2005/0096753 A1 * 5/2005 Arling et al. ................. 700/11

* cited by examiner

*Primary Examiner*—Daniel Wu
*Assistant Examiner*—Frederick Ott
(74) *Attorney, Agent, or Firm*—Orrick, Herrington & Sutcliffe, LLP

(57) ABSTRACT

Systems and methods that facilitate the selection and connection of sub-devices managed by virtual device or logical units (LUs) within a network. In one exemplary embodiment, LU connections are preferably brought to the IP layer using HTTP commands and responses. These IP layer commands are used to communicate connection information among the LUs involved in the connection and to allow for LUs to determine which sub-devices within the LU will be used in a connection. When the specific details have been determined, the sink device will work at the network specific level to make the actual connection. This allows for the connections between LUs to be network independent until all of the specific details of the connection have been determined. After that, a connection is established using network specific commands and protocols.

21 Claims, 17 Drawing Sheets

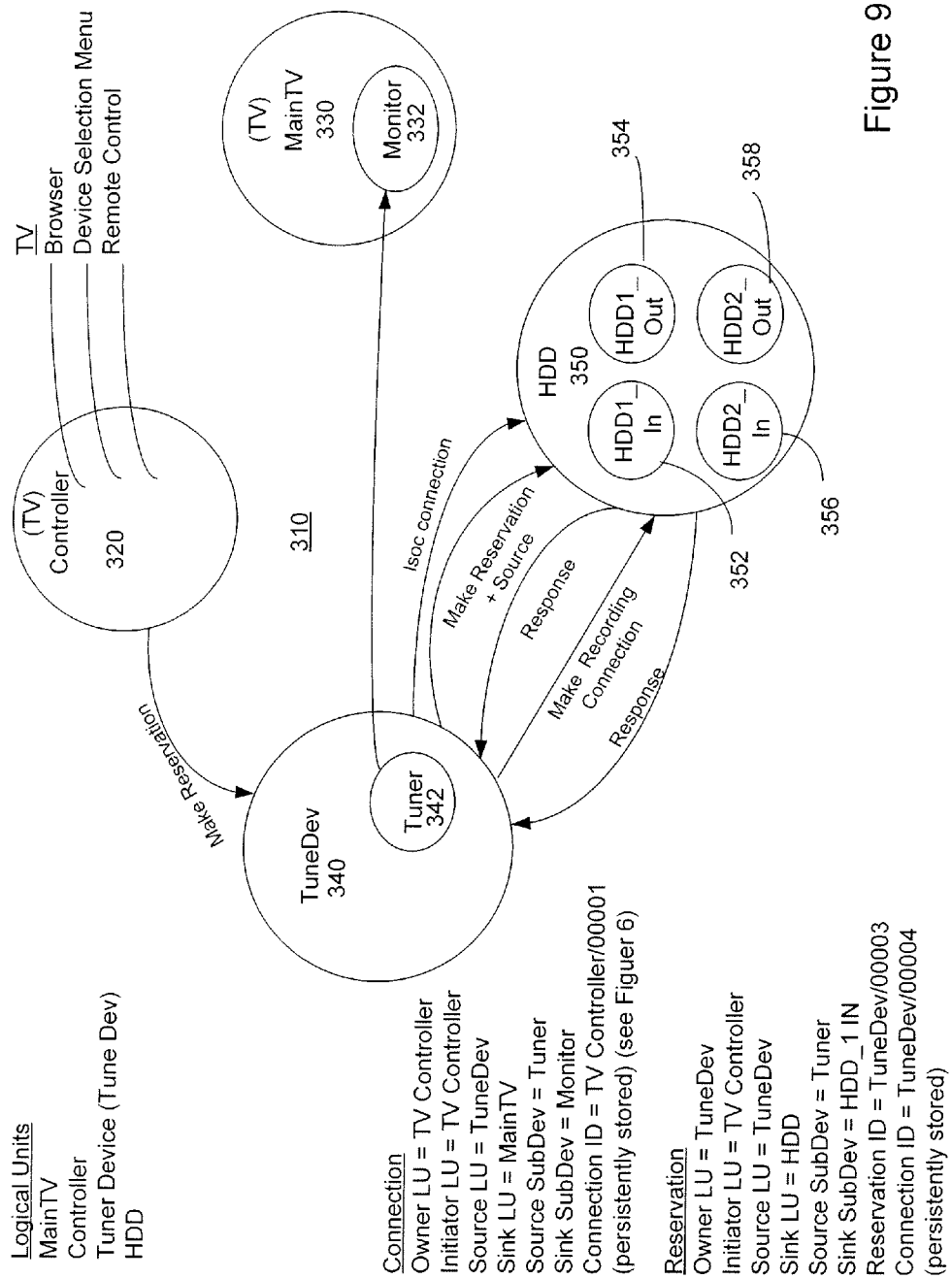

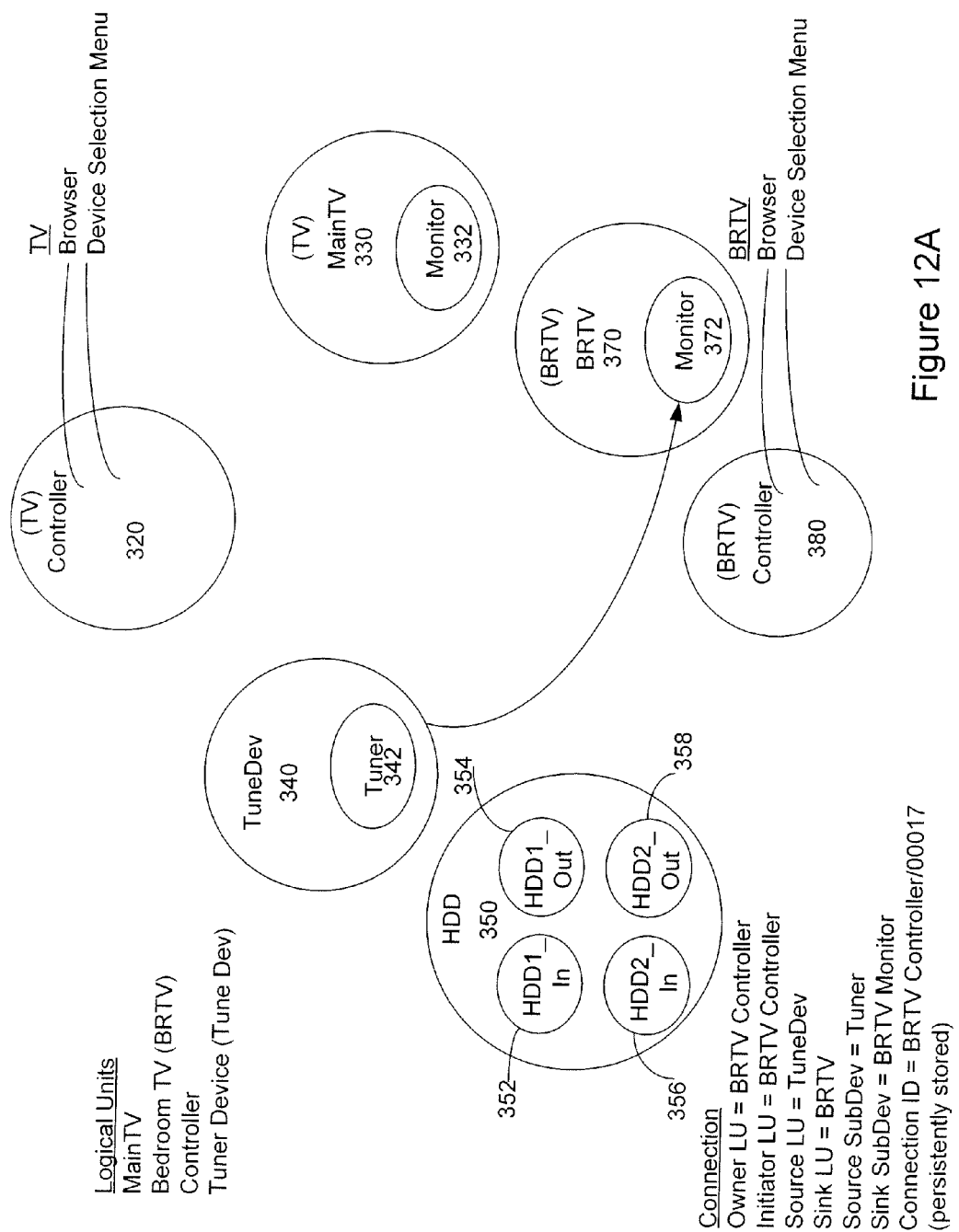

SYSTEMS AND METHODS FOR CONNECTING NETWORKED DEVICES

CROSS-REFERENCE TO RELATED APPLICATIONS

This application claims the benefit of U.S. Provisional Application No. 60/754,857 filed on Dec. 28, 2005, which is incorporated herein by reference.

FIELD

The present invention relates to networked devices including audio-video devices and, more particularly, to a network of devices with a user interface that is independent of the underlying network architecture and to systems and methods that facilitate and manage network connections.

BACKGROUND

Consumers typically view their televisions and audio-video (AV) components as a series of connected devices that perform discreet and relatively simple tasks with each AV device being controlled with a separate remote control unit or a separate device layer on a universal remote control unit. More complicated device features are generally accessed through menus displayed on the TV and navigated using the dedicated remote or device layer on the universal remote. Consumers' complaints typically focus on confusing physical device connections, the need for too many remote control units, or the difficulty in programming the not so universal remote control units.

Network solutions tend to alleviate the problem of confusing physical connections. For example, in a 1394 based network using Firewire™ the AV devices are simply linked together and to the TV in a daisy chain fashion over a single cable between sequentially linked devices and a single connector on individual devices. Unfortunately the manufacturers of network devices have added a great deal of complexity to their products requiring the consumer to learn multiple interfaces. Product interface standards such AV/C panel, HAVi, CEA-775-A, CEA-799, etc., have tended to be inadequate because they are unable to provide consumers with a standard or common interface that provides users with the same experience as a traditionally connected device.

One recently proposed solution provides a user interface (UI) independent of the underlying network architecture and protocols that provides the user with a consistent set of data for managing devices remotely on a network. (See, CEA 2027 Rev A). The UI is communicated using web based protocols (HTTP/TCP/IP) to allow a graphical UI to be sent from peripheral devices over a network, such as 1394, ethernet, powerline, etc., to be displayed on a rendering device such as a digital TV (DTV) or computer. The user is able to use a remote control unit to navigate the GUI to operate and control a variety of abstract or virtual network devices preferably referred to as Logical Units (LU). The LUs represent and control one or more sub-devices of the networked physical devices. Since the LUs can consist of any number and combination of sub-devices from various network devices, selection and connection of sub-devices managed by the LUs can be complicated and inefficient.

Systems and methods are therefore needed to facilitate selection and connection of sub-devices managed by the LUs within a network, and management of such connections.

SUMMARY

Provided herein are systems and methods that facilitate the selection and connection of sub-devices managed by the LUs within a network. In one exemplary embodiment, which is described below as an example only and not to limit the invention, LU connections are preferably brought to the IP layer using HTTP commands and responses. These IP layer commands are used to communicate connection information among the LUs involved in the connection and to allow for LUs to determine which sub-devices within the LU will be used in a connection. When the specific details have been determined, the sink device will work at the network specific level to make the actual connection. This allows for the connections between LUs to be network independent until all of the specific details of the connection have been determined. After that, a connection is established using network specific commands and protocols.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

FIG. 9 shows a schematic that illustrates a reservation scenario in accordance with a preferred embodiment.

FIGS. 12A and 12B shows a schematic that illustrates connection priority in accordance with a preferred embodiment.

DETAILED DESCRIPTION OF THE PREFERRED EMBODIMENTS

Described herein is a connection, reservation and management system for networked devices employed to enhance the user experience while operating a network of networked devices. Each of the additional features and teachings disclosed below can be utilized separately or in conjunction with other features and teachings to provide a connection, reservation and management system and methods for networked devices. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1A:
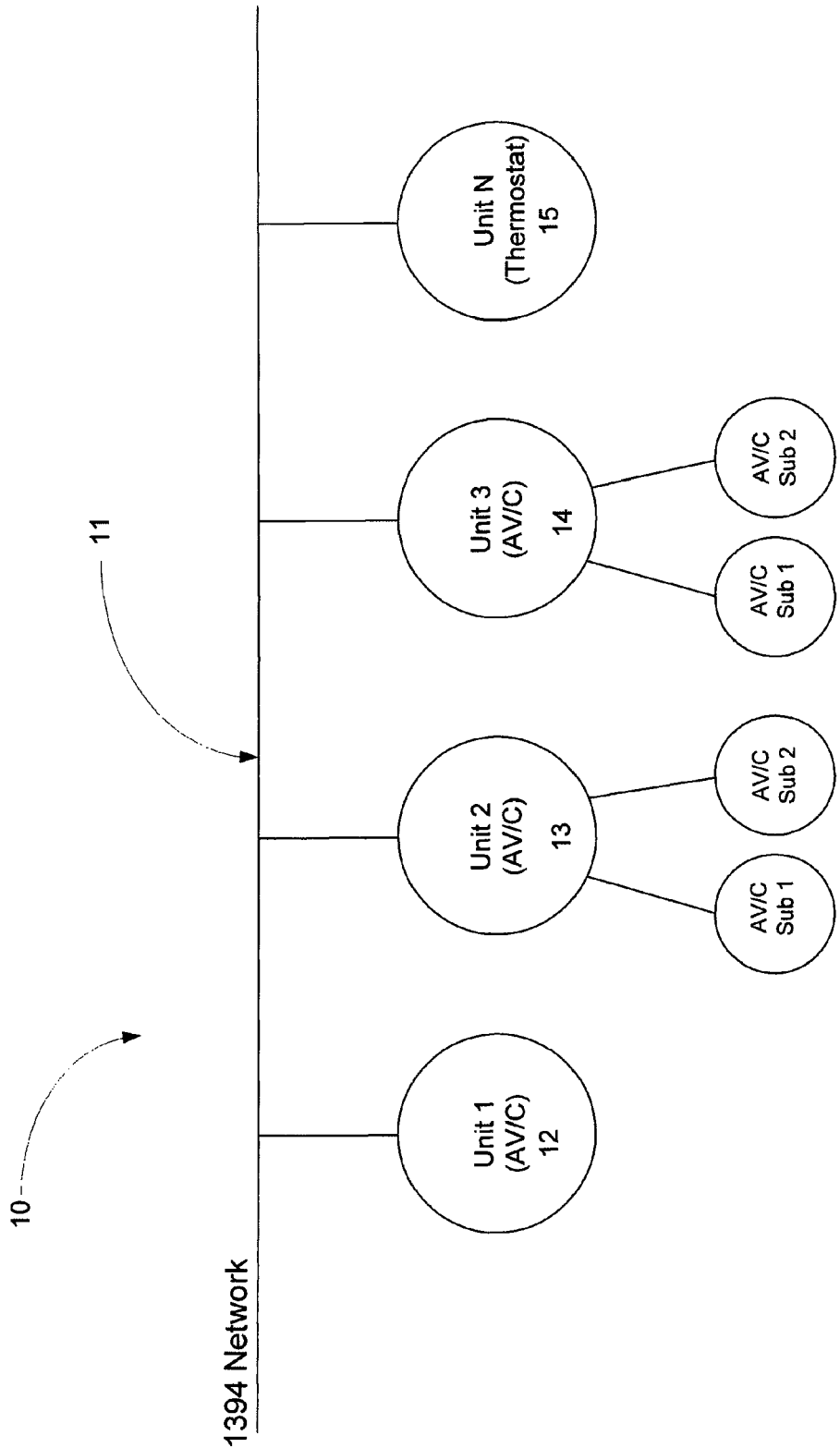
FIG. 1A shows a schematic of a network of networked devices.

Network and User Interface: As depicted in FIG. 1A, as an example only and not to limit the invention, a network 10 may comprise a 1394 network of AV/C devices 12, 13, 14 and other 1394 devices such as a thermostat 15, security system, and the like. In the present system, a user interface (UI) is provided that is independent of the underlying network architecture and protocols that provides the user with a consistent set of data for managing devices remotely on a network. (See, CEA 2027 Rev A). The UI is communicated using an IP, such as a web based protocol (HTTP/TCP/IP), that is independent of the underlying network protocols to allow a graphical UT to be sent from peripheral devices over a network to be displayed on a rendering device such as a digital TV (DTV) or computer. The network medium 11 over which the UI is communicated may be the same medium as the networked devices or another medium including such mediums as 1394, ethernet, powerline, cable, fiber, and the like, or no medium such as IR, RF, bluetooth, and the like.

The building block of the UI of a preferred embodiment is an abstraction or virtual device, preferably referred to as a logical unit, comprising a collection of commonly controlled and related services or functions of networked devices. Devices that are compliant with the UI of a preferred embodiment preferably include a server that presents the UI of its logical unit to the network browser and stores a data file in memory containing descriptions of various properties of the device and the LUs it contains.

Figure 1B:
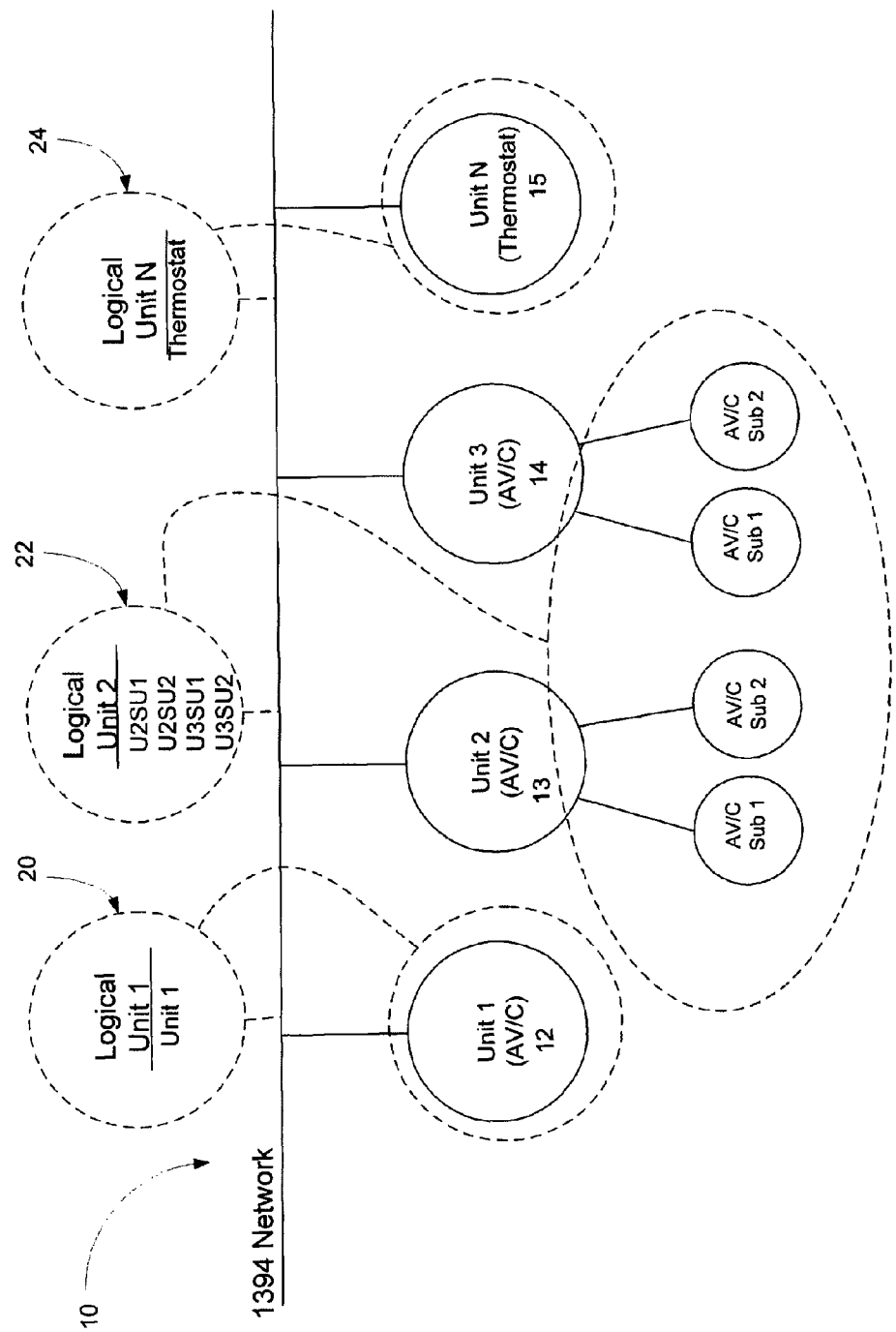
FIG. 1B shows a schematic of a network of networked devices with the implementation of LUs to manage the sub-units of the networked devices.

As depicted in FIG. 1B, the user is preferably provided with a view of the networked devices 12, 13, 14 and 15 as virtual devices or logical units (LU) 20, 22 and 24. The user is able to use a remote control unit to navigate a GUI to select, operate and control a variety of LUs. The LUs 20, 22 and 24 preferably represent and control one or more complete or sub-devices of the networked physical devices 12, 13, 14 and 15. A LU can represent a single physical device, e.g., a DVD player, a subset of the functions of a physical device, e.g., a tuner inside a DTV, or a set of functions that span more than one physical device, e.g., recording control for an audio-video hard disk drive (HDD) and DVD.

Figure 2:
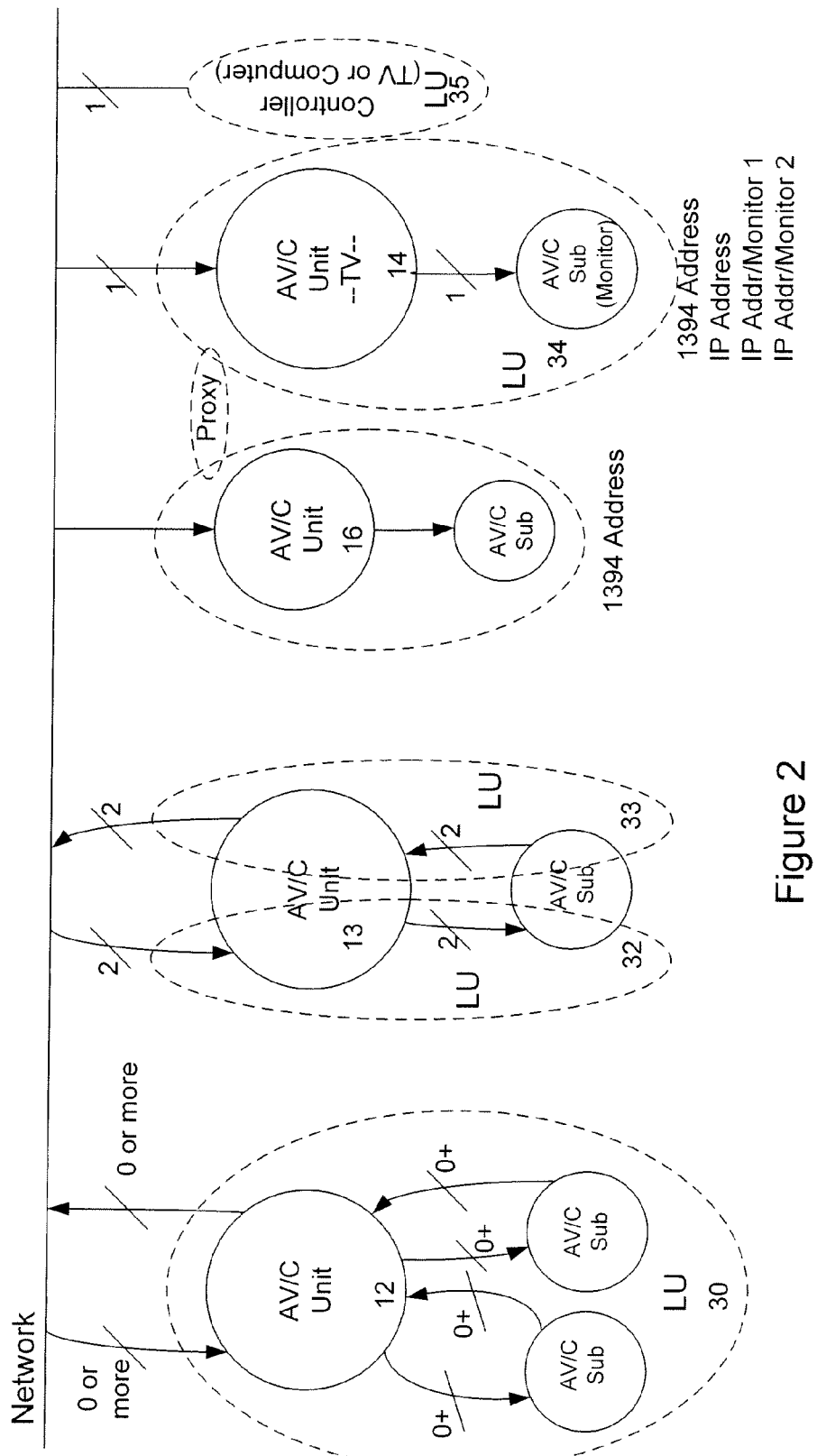
FIG. 2 shows a schematic that illustrates the grouping of LUs.
Figure 3:
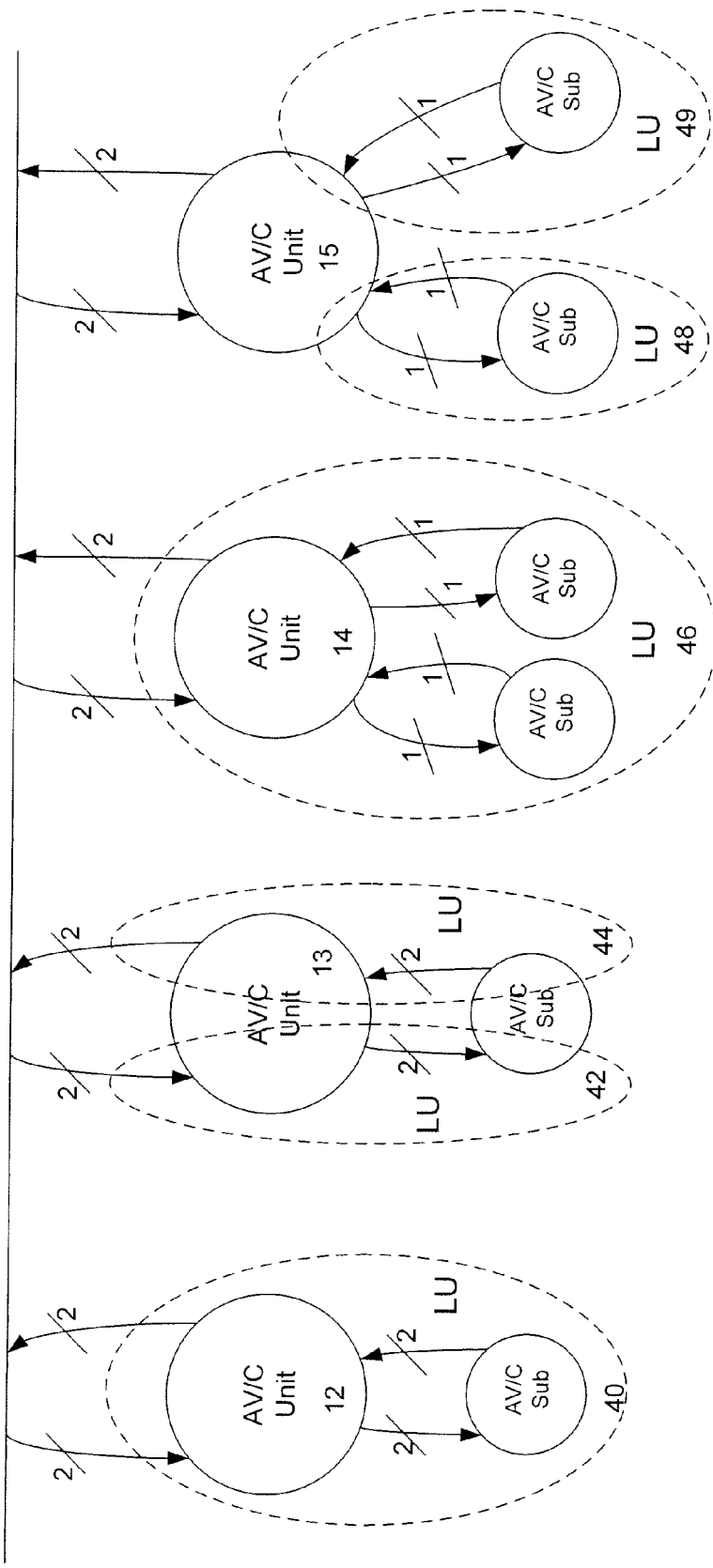
FIG. 3 shows a schematic that illustrates the grouping of AV/C units and sub-units into different LUs.
Figure 4:
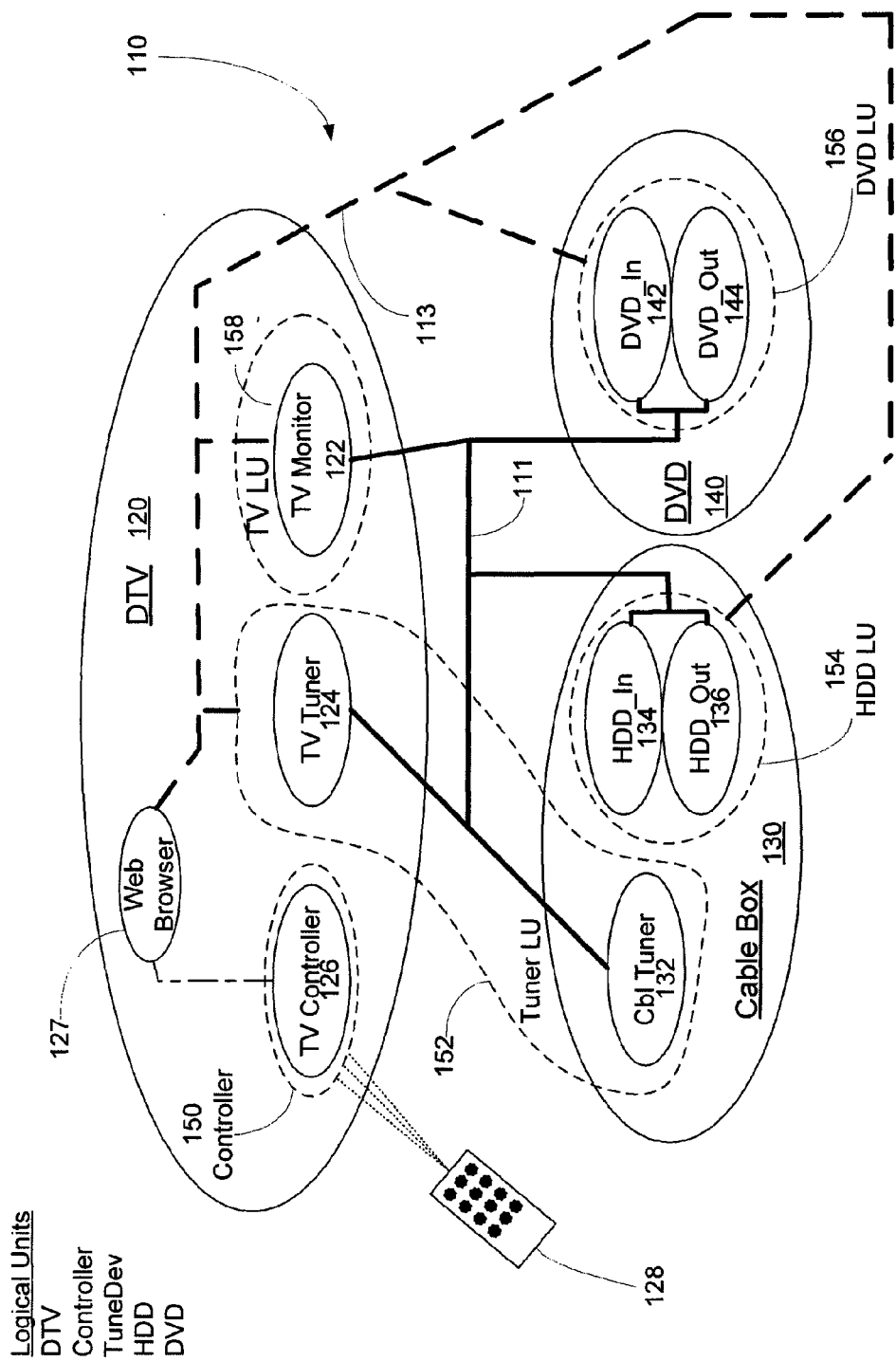
FIG. 4 shows a schematic that illustrates the grouping of sub-units of a DTV, cable box and DVD into different LUs.

FIGS. 2, 3 and 4 show additional LU concepts. In FIG. 2, a first object shows a generic LU 30 encompassing an entire AV/C device 12 and its sub-unit, a second object shows a more specific AV/C device 13 and its sub-unit being split up in to two LUs 32 and 33, a third object shows an AV/C device 16 and its sub-unit being proxied for by a LU 34 of a fourth object, which shows an AV/C device 14 such as a digital TV with a monitor sub-unit, and a fifth object shows a controller LU 35 of a TV or computer, which is preferably not visible to other LUs on the network.

FIG. 3 similarly provides a few examples of ways AV/C devices can be represented as one or more LUs. A first object shows a LU 40 encompassing an AV/C device 12 and its sub-unit, a second object shows the same type of AV/C device 13 and its sub-unit being split up in to two LUs 42 and 44, a third object shows a LU 46 encompassing an AV/C device 14 and its two sub-units and a fourth object shows the same type of AV/C device 15 as the third object with two LUs 48 and 49 encompassing its two sub-units.

FIG. 4 provides an example of a network 110 of devices including a cable box 130 and DVD 140 coupled to a DTV 120. As depicted, the DTV 120 sub-units include a monitor 122, an antenna tuner 124, and a controller 126. Although not depicted, one skilled in the art would recognize that a DTV would include an audio or speaker sub-unit. The DVD 140 sub-units include a DVDIn 142 and a DVDOut 144 and the cable box 130 sub-units include a tuner 132, an HDDIn 134 and an HDDOut 136. The media or content path 111 can be a 1394, ethernet, or some other network.

The device functions or services of the networked devices and sub-devices can be represented by a number of logical units, which, as depicted, include, e.g., a controller LU 150, a tuner LU 152, a HDD LU 154, a DVD LU 156 and a DTV LU 158. A remote control unit 128 preferably sends IR or RF signals to the controller LU 150. The web browser 127 transmits corresponding commands over a UI path 113 to the LUs. The UI path 113 can be the same network or medium or on a different medium or wireless medium, such as RF, blue-tooth, Wifi, and the like. Once the logical units have determined which media source and media sink sub-devices are to be connected, the connection is made between the subdevices, and the media is conveyed across the network medium 111 from the source sub-device, e.g., the cable turner 32 to the sink sub-device, e.g., the TV monitor 122.

Connection and Reservation System: As shown in FIGS. 1A through 4, in a preferred embodiment, virtual devices or logical units can consist of any number and combination of sub-devices from various network devices. The logical unit based UI of a preferred embodiment presents a common platform upon which user and device interaction is accomplished with sub-device specifics isolated from user and device-to-device control. In a preferred embodiment, as an example only and not to limit the invention, HTTP (IP) based commands are used for device control, connections, and reservations—cross platform functionality can be accomplished as a result. One skilled in the art would understand and appreciate that the logical unit based UI could be implemented using a variety of protocols.

In a preferred embodiment, logical units are created and given the responsibility of managing their sub-devices. Moreover, logical units preferably determine which sub-device should be involved in a connection, where to route commands, and which commands should be implemented and which should be rejected. Some logical units may exist that support different types of sub-devices. For some logical units, selection of the logical unit as a source or sink may require the additional selection of a specific sub-device. The determination of which sub-device to use is preferably the responsibility of the user and not other logical units.

Figure 5:
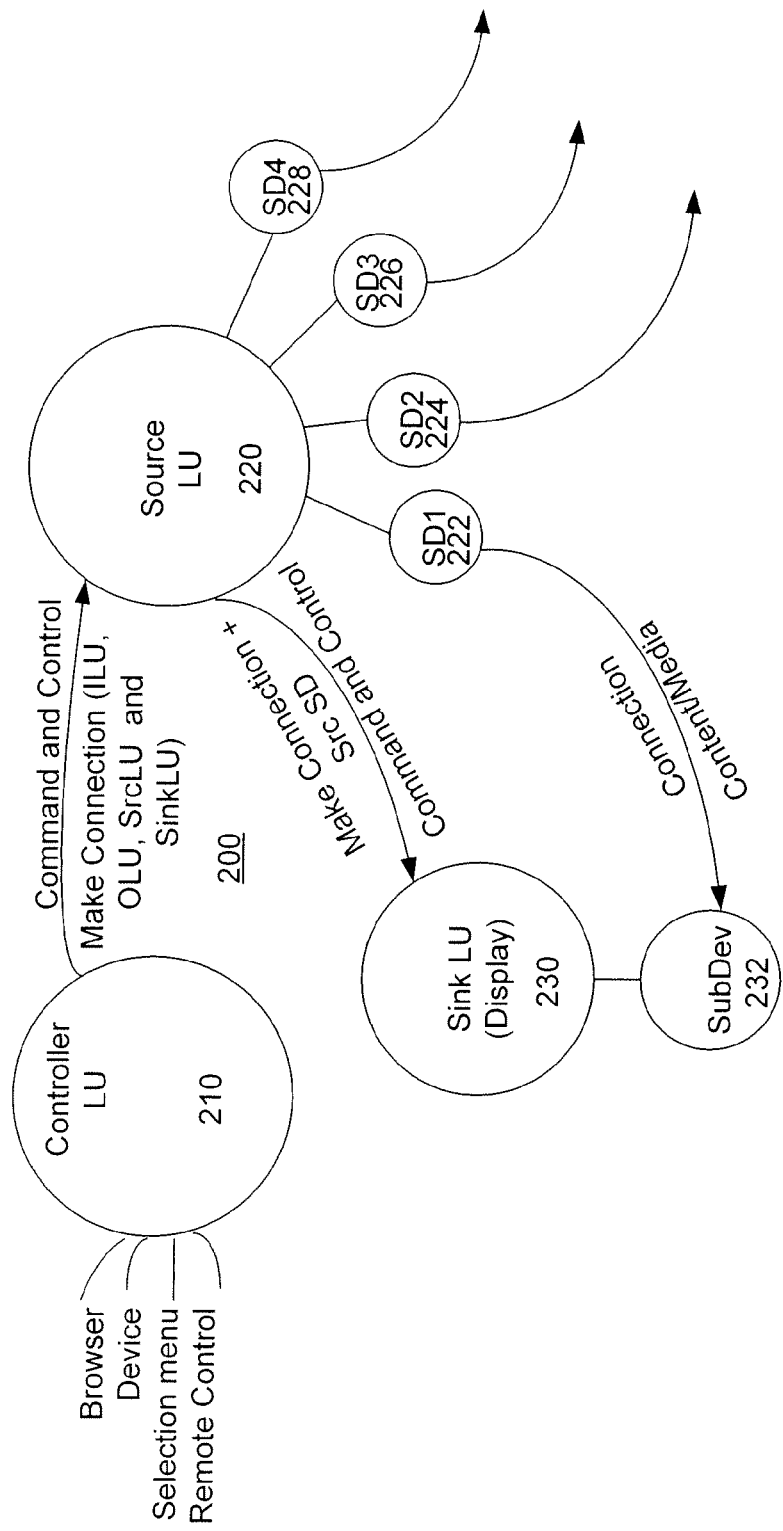
FIG. 5 shows a schematic that illustrates a connection approach according to a preferred embodiment.

In a preferred embodiment, as depicted in FIG. 5, connections between logical units (LU) 210, 220 and 230 are preferably brought to the IP layer using HTTP commands and responses. These IP layer commands are used to communicate connection information to and among the LUs involved in the connection and to allow for LUs to determine which sub-devices within the LU will be used in a connection. When the specific details have been determined, the sink device will work at the network specific level to make the actual connection. This allows for the connections between LUs 220 and 230 to be network independent until all of the specific details of the connection have been determined. After that, a connection is established using network specific commands and protocols.

One of the challenges with a LU-based system is the selection of sub-devices managed by the LU. In many cases there will be no decision to be made as the LU may only manage a single sub-device. In other cases, there may only be one sub-device that has an output and one that has an input so there is no additional decision process to go through. However, connections can get complicated when there are multiple choices of sub-devices present in the LU for use as a source or sink.

As depicted in FIG. 5, the source LU 220 has four sub-devices 222, 224, 226 and 228 to manage. In some cases, the LU will have logic to determine which sub-device should be used for a connection. This determination can be made based on a priori knowledge of the characteristics of the sub-devices it represents. In other cases it may be necessary for a LU to present choices to the user for proper sub-device selection to be made to meet the user's intention and resolve ambiguities. In a preferred embodiment, the system allows for the LU to determine what sub-devices should be used for a particular connection and there is a mechanism provided for the LU to have access to the user UI so any ambiguities can be resolved by the user.

As depicted, the source LU 220 determined that sub-device SD1 222 was available for connection to the sink device as the other sub-devices SDs 224, SD3 226 and SD4 220 are currently occupied in other connections. Once this sub-device information is conveyed in a connection request to the sink LU 230, the sink sub-device SubDev 232 worked at the network specific level, using network specific commands and protocols, to make the actual connection to source sub-device SD1 222.

In the preferred embodiment, there are preferably five types of connections that can be made. They include: 1) Immediate, Unknown Duration; 2) Immediate, Known Duration; 3) Delayed, Unknown Duration; 4) Delayed, Known Duration; and 5) Time Shift Viewing, Unknown Duration. An Immediate connection is one that needs to be made now. A Delayed connection is one that will be made sometime in the future. Known duration connections are normally made for the purpose of recording while unknown duration connections are normally made for presenting content to a user.

A connection preferably includes four participants: 1) Initiator—a LU with a user interface (UI) to be used for resolving connection or reservation ambiguities (ILU), 2) Owner—a LU that is responsible for making the connection (OLU), 3) Source LU (SrcLU), and 4) Sink LU (SnkLU).

1) Immediate, Unknown Duration Connections: This connection is generally initiated by a user interacting with a selection menu who wants to connect a source and sink device together for an unspecified duration. This is normally not a recording connection. For this type of connection, the typical roles are preferably defined as follows: 1) Initiator LU (ILU)—this is the controller/browser LU that the user is interacting with to specify the source and sink LUs for the connection and is used by the source and sink LUs to resolve any connection ambiguities with the user if necessary; 2) Owner LU—this is the same LU as the initiator LU; 3) Source LU—this is the source LU specified to the controller/browser by the user; and, 4) Sink LU—this is the sink LU specified to the controller/browser by the user.

Referring again to FIG. 5, a connection process is illustrated with regard to a network 200. As depicted, an Initiator LU (ILU), here the Controller LU 220, issues a connection request to a source LU (SrcLU) 220 that specifies a sink LU (SnkLU) 230. The command can optionally specify a specific source sub-device, e.g., SDI 222, SD2 224, SD3 226, SD4 228, and/or a sink sub-device 232 using the subunit name in the command. The SrcLU 220 determines a source sub-device to be used in the connection if not already specified. If source sub-device selection is ambiguous then the SrcLU 220 can use a notification request to the ILU 210 to display a selection menu panel prompting the user to make a selection. The content or mechanism used for this user selection is dependent on the type of source device. For example, a LU managing a group of HDDs might present a track list of all the tracks on all the HDDs. Upon a user's selection of a track, the SrcLU 220 would proceed with the connection process by forwarding the connection request to the SnkLU 230 along with the sub-device information for the source based on the track selection. Upon receipt of this command by the SnkLU 230, the SnkLU 230 determines the appropriate sub-device, e.g., SubDev 232, to be used in the connection if not already specified. If the sink sub-device selection is ambiguous then the SnkLU can use a notification request to the ILU 210 to display a selection menu panel prompting the user to make a sub-device selection. Once the sink sub-device is determined, the SnkLU 230 makes the connection to the specified source. After the connection is made, the SrcLU 220 would start playing the track selected by the user.

A reservation system in both the source and sink LUs preferably makes an entry in their respective reservation databases for immediate connections. The LU information specified in the connection is preferably used in the reservation. This information can be used by the LUs to determine control priorities for the devices involved in the connection.

2) Immediate, Known Duration Connections: This connection is generally initiated by a user interacting with a LU's control panel and selecting a program that is currently active to be recorded where the duration of the program is known or can be specified by the user. This is normally a recording connection. For this type of connection, the typical roles are preferably defined as follows: 1) Initiator LU—this is the controller/browser LU that the user is interacting with and is used by the source and sink LUs to resolve any connection ambiguities with the user if necessary; 2) Owner LU—this is the LU of the device who is responsible for controlling the SrcLU and SnkLU while this connection is active; 3) Source LU—the LU selected by the user from a control panel that the user is interacting with; and, 4) Sink LU—The LU selected by the user from a control panel that the user is interacting with.

The connection process is identical to the process described for an Immediate Unknown Duration connection with a couple of additions. First, since the duration of the connection is known, the future owner of this connection (OLU) preferably makes a reservation with the source and sink LUs to insure that the full duration of the connection can be supported by both LUs. Once the reservations have reached "Ready" status for both the SrcLU and SnkLU, the connection may be established. Second, the owner of the connection is responsible for termination of the connection when the specified duration has expired.

3) Delayed, Unknown Duration Connections: This connection is generally initiated by a user interacting with a LU's control panel and selecting content from the future to be shown on a non-recording sink LU. This is normally not a recording connection. For this type of connection, the typical roles are defined as follows: 1) Initiator LU—this is the controller/browser LU that the user is interacting with and is used by the source and sink LUs to resolve any connection ambiguities with the user if necessary; 2) Owner LU—this is the LU of the device who is responsible for controlling the SrcLU and SnkLU while this connection is active. This LU is also responsible for making the connection at the specified reservation time and for terminating the connection after the duration expires; 3) Source LU—the LU selected by the user from a control panel that the user is interacting with; and, 4) Sink LU—the LU selected by the user from a control panel that the user is interacting with.

The connection process is identical to the process described for an Immediate Unknown Duration connection with a couple of additions. First, the future owner of this connection (OLU) preferably makes a reservation with the source and sink LUs to insure that the devices are available at the starting time of the desired connection. When the reservation time for the connection arrives, the OLU preferably checks the status of the reservations to insure that the reservations have reached "Ready" status for both the SrcLU and SnkLU. The connection may then be established. Second, the owner of the connection is preferably responsible for establishing the connection at the specified reservation time.

4) Delayed, Known Duration Connections: This connection is generally initiated by a user interacting with a LU's control panel and selecting content from the future to be recorded by a sink LU. This is normally a recording connection. For this type of connection, the typical roles are defined as follows: 1) Initiator LU—this is the controller/browser LU that the user is interacting with and is used by the source and sink LUs to resolve any connection ambiguities with the user if necessary; 2) Owner LU—this is the LU of the device who is responsible for controlling the SrcLU and SnkLU while this connection is active and is also responsible for making the connection at the specified reservation time and for terminating the connection after the duration expires; 3) Source LU—the LU selected by the user from a control panel that the user is interacting with; and, 4) Sink LU—the LU selected by the user from a control panel that the user is interacting with.

The connection process is identical to the process described for an Immediate Unknown Duration connection with a couple of additions. First, the future owner of this connection (OLU) preferably makes a reservation with the source and sink LUs to insure that the devices are available at the starting time of the desired connection. When the reservation time for the connection arrives, the OLU preferably checks the status of the reservations to insure that the reservations have reached "Ready" status for both the SrcLU and SnkLU. The connection may then be established. Second, the owner of the connection is preferably responsible for establishing the connection at the specified reservation time and for terminating the connection when the duration expires.

Figure 11:
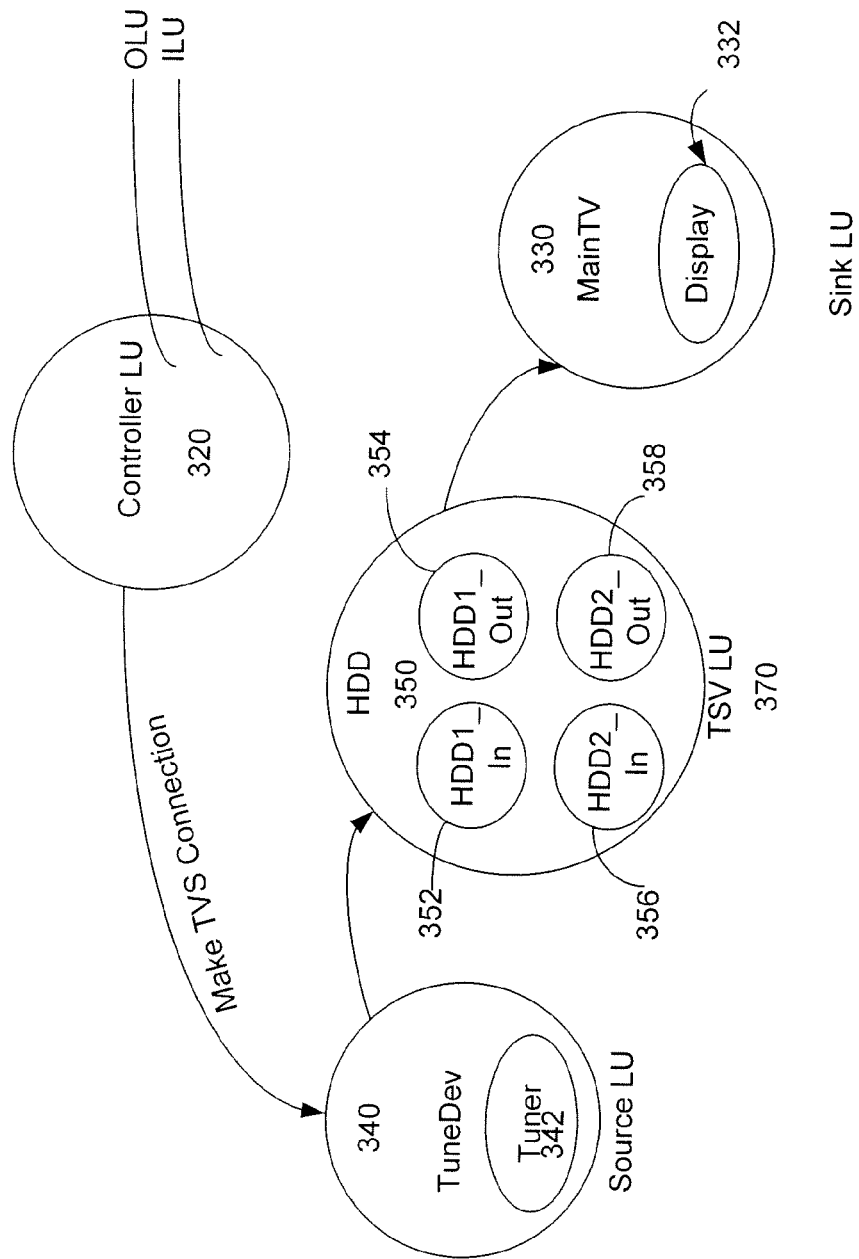
FIG. 11 shows a schematic that illustrates time shift viewing in accordance with a preferred embodiment.

5) Time Shift Viewing, Unknown Duration Connections: This connection is generally initiated by a user who wants to connect a source and sink device together for an unspecified duration and wants the Time Shift Viewing (TSV) functionality. A TSV connection is different from a normal recording connection. For the TSV function there are two connections: the TSV recording connection and the TSV playback connection (See FIG. 11). For this type of connection, the typical roles are defined as follows: 1) Initiator LU—this is the controller/browser LU that the user is interacting with and is used by the source and sink LUs to resolve any connection ambiguities with the user if necessary; 2) Owner LU—this LU, which is optional and not required to support TSV functionality, is the LU of the device who is responsible for controlling the SrcLU and SnkLU while this connection is active and will also manage the TSV functionality; 3) Source LU—the LU selected by the user from a control panel that the user is interacting with; 4) Sink LU—the LU selected by the user from a control panel that the user is interacting with; and, 5) Time Shift Viewing LU—the LU that performs the time shift viewing (recording and playback) function between the source and sink. This LU preferably declares its support of TSV using a TSV tag in its data file.

For a TSV connection, there are two connections made by the owner of the TSV function. First a connection is made from the SrcLU to the TSVLU (sink) for the TSV recording. Second, a connection is made from the TSVLU (source) to the SnkLU for the TSV playback.

To start the process, the owner (OLU) that wants to make the TSV connection sends a connection request to the SrcLU preferably with a TSVEnable flag set true and the TSVLU as the SnkLU of this connection. The SrcLU can reject the connection request immediately with an error code that indicates that it should not be the source of a TSV style connection. If the source rejects the connection request, the source is likely a transport type device or has internal TSV functionality. If rejected, the owner of the TSV connection request can attempt a direct connection between the source and sink bypassing the TSVLU to make an Immediate, Unknown Duration connection with no TSV functionality. If the SrcLU accepts the TSV connection request, the SrcLU chooses a sub-device for the connection and forwards the connection request to the SnkLU. If the SnkLU is TSV enabled and has the available resources, it can accept the connection request and make the connection. Now the SnkLU (TSVLU) knows that this is a TSV recording connection and will automatically initiate the TSV recording (implementation specific). There is no need to send a record command to the TSVLU.

Upon a successful connection response from the TSV recording connection, the owner of the TSV function will make the TSV playback connection. It issues the connection request to the SrcLU (TSVLU in this case) with the TSVEnable flag set true and an additional parameter called TSVConnectionID that relates this connection to the TSV recording connection. The TSVLU will select the sub-device to be used in the connection and forward the connection request to the SnkLU (typically a display device). Upon a successful connection response, the TSVLU will begin playback of the TSV recording track automatically.

In this connection process, the TSVLU is empowered to select the proper sub-devices to be used in the connection. It needs to select sub-devices that are capable of performing the recording and playback of a common track and that they are both available at the time of the connection.

The SrcLU for the TSV recording connection is responsible for generating a stream changed notification event to the OLU of the connection whenever the stream content changes. The most common reason for a stream change is when a tuner changes channels. This notification to the OLU permits it to act upon this change to restart the TSV recording if it is implemented to do so.

The TSVLU preferably supports the TSVRestart command that will cause it to restart the TSV recording and TSV playback. The meaning of TSVRestart is implementation specific to the TSVLU. This command is typically sent to the TSVLU by the OLU when a tuning source changes channels. The TSVLU preferably supports the Playback Stalled notification event to the OLU of the connection whenever the playback of a TSV track is paused because there is no more content to play from the TSV track.

For lost, dropped or new TSV connections, the OLU preferably acts as follows: If either connection is lost, the OLU, upon receiving notification of the lost connection, makes an effort to deliver source content to the sink by remaking connections with or without using TSV functionality; if the TSV recording connection is dropped by the TSVLU, the OLU, upon receiving notification of the dropped connection, attempts to establish a new TSV connection or at least a direct connection between the source and sink; if the TSV playback connection is dropped (not lost) by the SnkLU, the TSVLU should drop the TSV recording connection. The OLU, upon receiving notification of the dropped TSV playback connection, makes sure the TSV recording connection is dropped; and, if the OLU of the TSV connection wants to create a new connection to the SnkLU, the OLU preferably drops both of the TSV connections (recording and playback) before making the new connection (using TSV or not).

Aware of the TSV connections, the SrcLU provides a UI (service banner, control panel) that allows for the fact that the user may be watching content that is delayed from Live by an unknown amount of time. Using a Query Connection command directed at the TSVLU and specifying the connection ID of the TSV recording connection, the query will return status indicating the time difference between the TSV recording and the TSV playback. The SrcLU may use this information to provide UI program information that reflects what the user is currently viewing and not what the SrcLU is currently showing live.

Connections can be modified when a connection command is sent from a SrcLU (or possibly the OwnerLU or InitiatorLU) to a SnkLU with a connectionID that is already in use for an existing connection. The intent of the SrcLU is to connect a different sub-device to the SnkLU in order to continue the connection. This may need to happen when the user interacts with the SrcLU and it results in a different SrcLU sub-device needing to be used as the source. This technique is used when the connection shouldn't really be dropped, it's just that the source sub-device needs to be changed in order to comply with inputs from the user. This is preferably used when switching between a Source's sub-devices based on some action by the user, and not when changing Source LUs.

ConnectionID and ReservationID Format: The format for the ConnectionID and ReservationID is preferably specified as LUI/Number, where Number is a five digit number (zero padded as necessary to produce 5 digits) that is supplied by the owner of the connection/reservation and LUI is the logical unit Identifier of the owner. The "/" is literal. The owner shall increment the Number field for each connection/reservation identifier that is created. The Number field will wrap around to 00000 after reaching 99999. The Number field is stored in memory and is preferably persistent across AC power loss so as to prevent duplicate identifiers from being generated.

A <streamType> tag and streamType command parameter is preferably used to assist in determining if a connection has a chance to be successful between two LUs should the connection be made. The specification of stream type is optional. When it is specified, it is referring to stream types specified by broad category. Some stream types included MPEG2, H.264, DV, and the like.

Another use of stream type, in particular to support a converter profile, is the definition of some analog/digital signal types, which include Component, RF, HDMI, DVI, Video, and the like.

A Make Connection command is preferably used when a specific source and sink are to be connected. If the optional parameters of the command are not specified and there is not enough information to make the connection, then either the source or the sink device may reject the connection request with an appropriate error code. In these commands the LUs are preferably identified by their unique names and the sub unit devices are preferably identified by their names, e.g.:

```
GET L-unit/make_connection<proctype> ?connID=ConnectionID
[resID=ReservationID&owner=LUI&initiator=LUI]
&src=LUI[&srcSD=SubDeviceName]
&snk=LUI[&snkSD=SubDeviceName]
[&streamType=streamType]
[&tsvEnable=yes][&tsvConnID=ConnectionID]
```

The ConnectionID is preferably created by the owner of this request to uniquely identify this specific connection. The ReservationID (which is optional), when present, relates this connection request to an existing reservation. Owner is the LU identifier representing the owner of this request. The Owner parameter is preferably included in unreserved connection requests. The Initiator (which is optional) is the LU identifier of the controller that is initiating this request and is to be used by the source or sink to access the user UI for resolving any ambiguities in the connection. This parameter is preferably only included in unreserved connection requests. Source LU is the source LU for this connection and srcSD is the name of the sub-device in the source LU as specified in the data file. This parameter is optional when directed at the SrcLU but required when directed at the SnkLU. If this parameter is present in the command received by a SrcLU then the SrcLU shall use it in the connection process. Sink LU is the sink LU for this connection and snkSD (which is optional) is the name of the sub-device in the sink LU as specified in the data file. If this parameter is present in the command received by a SrcLU then it is preferably forwarded in the connection command sent to the SnkLU. If this parameter is present in the command received by a SnkLU then the SnkLU shall use it in the connection process. This parameter preferably is not specified in a connection modification operation. The StreamType can be provided by the owner of the command. It can also be added by the SrcLU. These stream types are the broad stream types. If multiple stream types are supported then this parameter should not be specified. The tsvEnable specifies that the connection is a special TSV connection. If this parameter is present in a command received by a SrcLU then it is preferably forwarded in the connection command sent to the SnkLU. The SrcLU preferably is not used in a TSV type connection, the SrcLU preferably fails the connection request with a NoTSV reason. The TSVConnectionID tsvConnID—

(required for TSV playback connection, optional for TSV recording connection) shall specify the Connection ID of the existing connection to associate the TSV connection with. It is used by the TSVLU to relate the recording track to the playback. If this parameter is present in a command received by a SrcLU then it is preferably forwarded in the connection command sent to the SnkLU.

In a preferred embodiment, the connection protocol preferably specifies that a new connection is initiated by the Owner LU issuing a connection request to the Source LU (src). The Source LU determines, if not already specified, the Source Sub-Device (srcSD) information to the connection request and forwards the request to the Sink LU (snk). The SrcLU generates a "pending" response to the OLU and ILU indicating that the command has been accepted for processing. The Sink LU determines the Sink Sub-Device information (snkSD) (if not already specified) and makes the connection as determined by the network protocols. The response from the Sink LU will reflect the Source LU and Sub-Device as well as the Sink LU and Sub-Device information involved in the connection. The response from the Sink LU is returned to the Source LU. The SnkLU will also generate a Connection Changed notification to the OLU and ILU indicating the connection status. If the optional Sub-Device parameters are specified but cannot be used in the connection, the connection request is preferably rejected. Alternatively, an alternate sub-device to the one specified can be used, but is not preferred.

An example of a return response to the make_connection command preferably includes:

```
<make_connection>succeeded</make_connection>
<connectionInfo>
<connID>connectionID</connID>
[<resID>reservationID</resID>]
<owner>LUI</owner>
<initiator>LUI</initiator>
[<streamType>streamType</streamType>]
<source>
    <logical_unit>LUI</logical_unit>
    <sub_device>SubDeviceName</sub_device>
</source>
<sink>
    <logical_unit>LUI</logical_unit>
    <sub_device>SubDeviceName</sub_device>
</sink>
[<tsvEnable>yes</tsvEnable>]
[<tsvConnID>tsvConnectionID</tsvConnID>]
<recording>yes|no</recording>
</connectionInfo>
``` on a success case or

```
<make_connection>pending</make_connection>
<connID>connectionID</connID>
``` on a pending case.

A success response is sent when it is known that the connection has been successfully made. A pending response is sent when it is not known if the connection has been made. The pending response is used when the server in the LU cannot be certain that it will be able to respond to the command within the timeout limits. Since the SrcLU cannot know how long the SnkLU will take to respond to the make_connection command, the SrcLU will almost always send a pending response to the OLU and ILU of the connection unless it knows it is going to fail the connection request. The SnkLU may send a success or pending response to the SrcLU depending on whether it can service the connection command immediately (and send a success or failed response) or whether it needs to get additional input from the user (pending response).

The following response preferably is sent for a failed connection:

```
<make_connection>failed</make_connection>
<connID>connectionID</connID>
<reason>see table below</reason>
```

The reasons for a connection failure include: a) StreamMismatch—the stream type specified is not supported by one of the LUs specified in the connection; b) NoDevice—one or more of the LUs and/or sub-devices is not present on the network; c) Bandwidth—there is not enough bandwidth on the network for the connection to be made; d) PortShortage—one or more of the sub-devices do not have an available network port to make the connection with; e) 1394_NNN—an error specific to the IEEE-1394 network where NNN is a 3 digit error number; f) InvalidParam—one or more parameters are not valid; or g) NoTSV—this error is returned only by a SrcLU if it should not be the source of a TSV connection (typically a transport type device, disc, vcr, etc. . . . ).

The SnkLU preferably sends a Connection Changed Notification to the ILU and OLU to inform them that the connection process has completed (success or failure). The SnkLU preferably sends a Connection Change Notification to the SrcLU if it responded to the make_connection command with a pending response. The Connection Changed Notification preferably uses either the Success or any of the failure reasons defined above. The LUs that receive this notification (success case only) may use the Query Connection command to retrieve the detailed connection information.

A Drop Connection Command preferably includes:
GET L-unit/drop_connection<proctype>?connID=ConnectionID This command preferably always is directed at the sink device involved in the connection to be dropped.

The return response for the drop_connection command preferably includes:

```
<drop_connection>succeeded<drop_connection>
<connID>connectionID</connID>
``` on a success case and

```
<drop_connection>failed<drop_connection>
<connID>connectionID</connID>
``` on a failure case.

Table 1.0 provides a summary of how connections are dropped and how LUs preferably respond to the connection problems. A Query Connection Command, which preferably includes

```
GET L-unit/connection_query<proctype>[?srcsnk=Source|Sink] |
[?connID=ConnectionID]
``` returns a list of all connections based on the command parameters, where a srcsnk parameter (optional) is used to specify that only Source or Sink connections are to be returned in the connection listing (if not specified then both source and sink connections are returned), and a connID parameter (optional) is used to specify that only the connection information for the specified connection is to be returned.

An example of a return response to the connection_query preferably includes:

```
<connection>yes</connection>
<connectionInfo>
<connID>connectionID</connID>
[<resID>reservationID</resID>]
<owner>LUI</owner>
<initiator>LUI</initiator>
<streamType>streamType</streamType>
<source>
    <logical_unit>LUI</logical_unit>
    <sub_device>SubDeviceName</sub_device>
</source>
<sink>
    <logicalUnit>LUI</logicalUnit>
    <sub_device>SubDeviceName</sub_device>
</sink>
[<tsvEnable>yes</tsvEnable>]
[<tsvConnID>tsvConnectionID</tsvConnID>]
[<tsvDelay>hh:mm:ss</tsvDelay>
<recording>yes|no</recording>
</connectionInfo>
``` on a success case with multiple <connectionInfo> blocks (one for each connection).

The <tsvDelay> tag specifies the time delay in hours, minutes, seconds, between the TSV recording connection and the TSV playback connection. This optional tag is preferably only included when the information can be determined.

It preferably returns:

<connection>no</connection> in a failure case or when there are no connections currently active.

An example of a Time Shift Viewing Restart command, which preferably includes:

```
GET L-unit/tsv_restart<proctype>?connID=connectionID&cmdOwner=L-unit-name
``` is preferably issued to a TSVLU type device to command it to restart the TSV recording. This would normally be issued to a TSVLU when a channel change occurs in the source of the TSV connection.

The reservation system is employed to improve network performance for the user by allowing resources to be allocated prior to use. This permits the user to manage the network resources effectively by not over-allocating device resources.

The reservation system allows for reservations to be made, queried, and deleted. For delayed connections, reservations are made with both the source and sink devices that are to be involved in the connection. This reservation preferably has an owner who is responsible for managing the reservation, an

TABLE 1.0

| Drop Reason | Actions Taken | Notifications |
| --- | --- | --- |
| Drop Connection cmd directed at SnkLU | SnkLU drops connection and sends response to command originator | SnkLU notifies SrcLU, OLU, ILU that connection was dropped. |
| Drop Connection cmd directed at SrcLU | SrcLU returns error | |
| Unable to restore connection after Bus Reset | SrcLU and SnkLU remove connection from internal connection database. | Both SrcLU and SnkLU notify the OLU and ILU that the connection was lost if the ILU and/or OLU are still on the network with the device |
| SrcLU or SnkLU removed from network | SrcLU and SnkLU remove connection from internal connection database. | Both SrcLU and SnkLU notify the OLU and ILU that the connection was lost if the ILU and/or OLU are still on the network with the device |
| SnkLU decides to drop connection to make a different network connection | SnkLU drops connection | SnkLU notifies SrcLU, OLU, ILU that connection was dropped. |
| SnkLU decides to drop connection because network connection is no longer needed (power off, user watches non-network input, etc.) | SnkLU drops connection | SnkLU notifies SrcLU, OLU, ILU that connection was dropped. | initiator that initiated the reservation, a source and sink, a start time/date, and an optional duration. Reservations that have no duration are preferably not used in determining resource availability.

In a delayed connection, the ReservationID for the connection is preferably the same as one used for a reservation. When the ReservationID of the connection request matches the ReservationID of a reservation, then the LU shall use the device specific information, if any, present in the reservation for making the connection. Reserved connections preferably have priority over any existing unreserved connection; therefore, if an existing non-reserved connection is conflicting with the request for a reserved connection, priority preferably is given to the reserved connection request. Conflicting reserved connection requests preferably do not occur except potentially when there are back-to-back reservations and one connection has not been terminated prior to a new connection request being initiated. Such overlap can occur when different controllers have slightly out of sync date/time settings. The connection owner is preferably tolerant of this problem and preferably retries the connection request several times over a short period of time in an attempt to make a successful connection.

All devices on the network that are capable of owning a reservation preferably have access to a real-time clock/calendar and are synchronized to within 1 minute of each other. The synchronization may be accomplished by any means available. Only devices that are going to be Owners of connections preferably have real-time clocks.

SrcLUs and SnkLUs involved in a reservation are preferably not responsible for enforcing the timing of a reservation being kept (started at the proper time and for the proper duration). The LU owners of the reservations and connections are responsible for maintaining the integrity of the reservation system by making and dropping connections when they are scheduled to do so. It is acceptable for a LU to automatically drop a reserved connection in favor of a new reserved connection request (when there are resource conflicts) if it is able to determine that the duration of the connection has exceeded the reserved duration.

An example of a Make Reservation command preferably includes:

```
GET L-unit/make_reservation<proctype>?resID=ReservationID
&owner=LUI&initiator=LUI
&srcsnk=Source|Sink
[&subDevice=SubDeviceName]
&type=Immediate|Delayed
&startDate=mm/dd/yyyy&startTime=hh:mm:ss[&duration=hh:mm:ss]
[&streamType=streamType]
[&query=yes]
[&record=yes]
```

The command parameters are defined as follows:
resID—The ReservationID that will be used when the connection is made.
owner—The LU that is initiating this request.
initiator—The LU to be used by the source or sink to access the user UI for resolving any ambiguities in the reservation.
srcsnk—Specifies that the LU is the source or the sink for this reservation.
subDevice—(optional) The name of the sub-device in the L-unit as specified in the data file.
type—Indicates if the reservation is for an immediate connection or a delayed connection.
startDate—Start date of the reservation.
startTime—Start time of the reservation.
duration—(optional) Duration of the reservation starting at the specified startDate and startTime. If not specified, then this is intended primarily for specifying the owner and initiator of the reservation for the purpose of control priority.
streamType—(optional) The StreamType can be provided by the owner of the reservation. These stream types are broad stream types.
query—(optional) This specifies that the reservation request is simply a query to find out what the status response will be if the reservation request were to be issued. This option is used when other devices want to determine before hand if a LU is available. The recipient of a reservation command with this option set should generate a proper response but not take any action upon the request. No reservation is actually made.
record—(optional) This specifies that the reservation request is intended to be for a recording.

The make reservation command requests for a reservation to be made with the LU as either a source or a sink device. Since the LU knows about its sub-device types and their capabilities, it is able to determine if the reservation request can be accepted. If rejected, an error code is preferably returned indicating the reason for the rejection. If accepted, it is the responsibility of the LU accepting the reservation to resolve any ambiguities in the selection of a specific sub-device (or other information) that it controls. If a LU needs to resolve the ambiguities it preferably uses a notification mechanism directed at the ILU specified in the command parameter list to present to the user a screen with the options for resolving the ambiguity. If this is an immediate reservation, the LU preferably uses a higher priority notification request that forces the notification to be presented to the user immediately. Otherwise, a lower priority notification request could be used. Once the ambiguity is resolved, the LU preferably updates the reservation status. The information obtained from the user is stored internally in the LU with this reservation to be used later when the connection is made. When the owner of this reservation is ready to make the connection for this reservation, the owner uses the ReservationID used in the reservation as the ReservationID in the connection command. The source and sink devices will use the device specific information obtained from the user (if any) during the reservation processing to complete the connection process.

Reservations are preferably deleted by the SrcLU and SnkLU after the reservation is used in a connection and the connection is terminated.

An example of a return response for the make_reservation command preferably includes:

```
<make_reservation>succeeded</make_reservation>
<reservationInfo>
<resID>ReservationID</resID>
<owner>LUI</owner>
<initiator>LUI</initiator>
<status>see table 2.0</status>
<srcsnk>source|sink</srcsnk>
[<subDevice>SubDeviceName</subDevice>]
<startDate>mm/dd/yyyy</startDate>
<startTime>hh:mm:ss</startTime>
[<duration>hh:mm:ss</duration>]
[<record>yes</record>]
</reservationInfo>
``` on a success case. The <status> tag indicates the current status of the reservation. The following keywords are defined:

TABLE 2.0

| Keyword | Description |
| --- | --- |
| Ready | Reservation was accepted |
| Conditional | Reservation was conditionally accepted but will be rejected or accepted later |

An example of a response preferably includes:

```
<make_reservation>failed</make_reservation>
<reason>see Table below</reason>
``` on a failure case. The reservation failure reasons are defined below:

Reservations can be dropped using a Drop Reservation Command, e.g.:
   GET   L-unit/drop_reservation<proctype>?[resID=ReservationID]|[owner=LUI]

This command tries to drop the reservation specified by resID (single reservation) or Owner (may delete multiple reservations). An example of a return response for the drop_reservation preferably includes:

```
<drop_reservation>succeeded<drop_reservation>
{<resID>reservationID</resID>}
``` on a success case. There can be multiple <resID> occurrences in the case where multiple reservations are being dropped.

TABLE 3.0

| Keyword | Description |
| --- | --- |
| NoReserve | Reservations are not accepted by this LU |
| ResourceLimit | Reservaton could not be accepted because resources are not available to meet the request |
| OutOfMemory | The LU cannot make the reservation because it has run out of memory. The owner of the reservation request should try again later. This is returned only when the reservation would normally be accepted. |
| ReqError | There was an error processing the reservation request |
| Unknown | An unspecified error occurred while processing the reservation request |

For a failure case, an example of a return response preferably includes:

```
<drop_reservation>failed<drop_reservation>
[<resID>reservationID</resID>]
[<owner>LUI</owner>]
``` when there are no reservations to delete.

A Query Reservation Connection command can be used to return a list of all reservations based on the command parameters. An example of such a command preferably includes:

```
GET L-unit/query_reservation<proctype>?[srcsnk=Source|Sink] | [&resID=ReservationID]
```

Where the parameters srcsnk (optional) specifies that only Source or Sink reservations are to be returned in the reservation listing (if not specified then both source and sink reservations are returned) and resID (optional) specifies that only the reservation information for the specified reservation be returned.

An example of a return response for the reservation query preferably includes:

```
<reservation>yes</reservation>
<reservationInfo>
<resID>reservationID</resID>
<owner>LUI</owner>
<initiator>LUI</initiator>
<status>see table 4.0</status>
<srcsnk>source|sink</srcsnk>
[<sub_device>SubDeviceName</sub_device>]
<startDate>mm/dd/yyyy</startDate>
<startTime>hh:mm:ss</startTime>
[<duration>hh:mm:ss</duration>]
[<record>yes</record>]
</reservationInfo>
``` on success case with multiple <reservationInfo> blocks (one for each reservation that matches the criteria). Table 4.0 provides a description of status keywords.

TABLE 4.0

| Keyword | Description |
| --- | --- |
| Active | The reservation is currently associated with an active connection |
| Ready | The reservation is ready to be invoked with a connection |
| Conditional | Reservation was accepted but selection of a specific sub-device needs user intervention. When the user resolves the problem, the status will change to Ready. If the user fails to resolve the problem, the status will change to Rejected. In either case, the LU is responsible to send out the Reservation Changed notification when the reservation status changes. |
| Rejected | The reservation is rejected (for any reason including resource conflicts) |
| Unknown | An unspecified error occurred while processing the reservation request. The request is rejected. |

If there are no reservations that match the search criteria or there is an error processing the request, the following response is preferably returned:

<reservation>no</reservation>

Management of Reservations: Several issues, including persistence, deletion and control priority need to be managed with respect to reservations.

Persistence: The owner of a reservation is preferably responsible for storing the reservation in its own local persistent storage in order for the reservation to persist across an AC power loss. Every time a LU appears on the network, all LUs preferably check their internal reservation list to determine if they have any reservations previously established with the new LU. If so, each device preferably queries the new LU for its reservations list and compares it with its internal list. For any reservation that is missing from the new LU, each LU preferably makes the reservation again with the new LU.

Deletion: The owners of reservations are preferably responsible for deleting reservations when the reservation is no longer needed. If the reservation is kept by the owner by establishing a connection for the reservation, then the source and sink LUs involved in the connection are responsible for deleting the reservation when the connection is dropped, lost, or is attempted and fails. If a connection is modified, the reservation is preferably unchanged. A source and sink LU preferably delete unused reservations when a connection is established for a reservation that occurs after the unused reservation by more than 10 minutes. This provides for an automatic cleanup of unused reservations and keeps them from accumulating and filling up memory unnecessarily.

Control Priority: The connection system preferably provides a mechanism to identify the LUs that are using or are involved in a connection. This information is preferably used as a means to determine if commands defined in CEA931 from LUs should be accepted or rejected. Acceptance of commands from LUs that are involved in a connection and rejecting commands from LUs that are not involved in a connection improves the user experience by prioritizing "who" has control in a networked environment.

Recording connections preferably take the most care in not allowing users to make changes to the source or sink that would disrupt the recording. LUs involved in a recording connection preferably only accept commands that are referred to as "deterministic" commands by CEA931. This eliminates most user oriented key commands from being processed and possibly disrupting the recording. Intelligent controllers that are managing the recording preferably use the "deterministic" commands for control of LUs in a recording connection.

Multiple connections for the same SrcLU and sub-device (from different connectionIDs) can also have a sense of priority. The LUs associated with the first connection have control over the resource until the associated connection is dropped. Then the LUs involved in the connection that was made most recently for the same SrcLU and sub-device are now given control. Connections that are associated with a reservation preferably have higher priority than connections made without a reservation.

Example Scenarios: This section presents several scenarios that illustrate the usage of the connection and reservation controls that have been described. For these scenarios and for exemplary purposes only, there are 4 devices: a TV, a Cable Box, and 2 Hard Disk Drives A and B. The devices are broken down into their LUs and Sub-Devices in Table 5.0.

Figure 6:
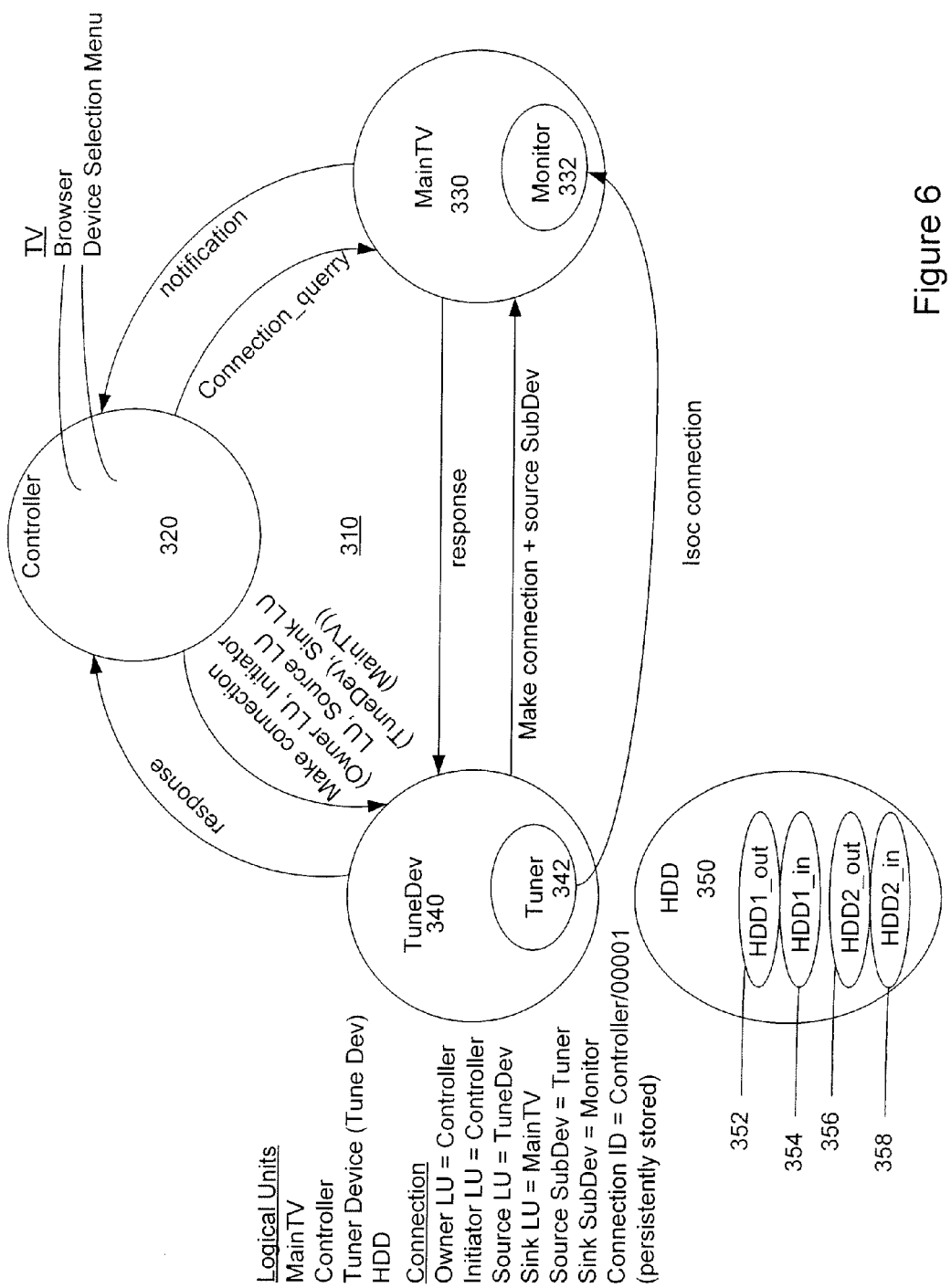
FIG. 6 shows a schematic that illustrates a connection scenario in accordance with a preferred embodiment.

As shown in Table 5.0 and in FIG. 6, the TV device has two LUs named MainTV 330 and Controller 320. The Controller LU 320 is preferably invisible to other LUs so it will be ignored by other LUs in the network 310 as far as it being a source, sink, or having any UI to provide. The MainTV LU 330 is a sink type LU and has one sub-device that it manages. The sub-device represents an AV/C monitor subunit, Monitor 332, with a destination plug (and speakers) in the TV.

TABLE 5.0

| | LU | | Sub-Device | |
| --- | --- | --- | --- | --- |
| Device | Name | Type | Represents | Name |
| TV | MainTV | Sink Only | AV/C Monitor Subunit w/one subunit destination plug | Monitor |
| | Controller (controller/browser) | Invisible | | |
| Cable Box | TuneDev | Source Only | AV/C Tuner Subunit w/one subunit source plug | Tuner |
| Hard Disk A | HDD | Either | AV/C Disc Subunit w/one subunit source plug from Hard Disk A | HDD1_Out |
| | | | AV/C Disc Subunit w/one subunit destination plug from Hard Disk A | HDD1_In |
| | | | AV/C Disc Subunit w/one subunit source plug from Hard Disk B | HDD2_Out |
| | | | AV/C Disc Subunit w/one subunit destination plug from Hard Disk B | HDD2_In |
| Hard Disk B | Managed by HDD LU in Hard Disk A | | | |

The Cable Box device has one LU named TuneDev 340. The TunDev 340 is a source type LU and has one sub-device that it manages. The sub-device represents an AV/C Tuner subunit, Tuner 342, with a source plug in the Cable Box.

The Hard Disk Drives A and B are preferably represented by a single LU that is located or hosted in Hard Disk A. The identical HDDs are preferably designed with logic for each disc that allows the two disc drives to identify each other and determine which one would host the LU. Hard Disk A has created a LU named HDD 350. The HDD LU 350 is both a source and sink type LU (either) and has four sub-devices that it manages. Each Hard Disk has one AV/C Disc subunit with a source and destination plug so there are two subunits with two plugs each for a total of four sub-devices, i.e., HDD1_In 352, HDD1_Out 354, HDD2_In 356 and HDD2_Out 358.

For the purpose of the following scenarios, Table 6.0 provides abbreviations that are preferably used in the commands to make the commands easier to understand:

TABLE 6.0

| LU Name | LU Identifier Used in Commands (examples) | Abbreviation |
|---|---|---|
| TV's MainTV | TV/MainTV | DisplayLU |
| TV's Controller | TV/Controller | ControllerLU |
| Cable Box's TuneDev | CableBox/TuneDev | TunerLU |
| AVHDD's HDD | HardDisc/HDD | HDDLU |
| TV's MainTV | /192.168.0.1:8080/display | DisplayLUAddr |
| TV's Controller | /192.168.0.1:8080/controller | ControllerLUAddr |
| Cable Box's TuneDev | /192.168.0.2:8080/tuner | TunerLUAddr |
| AVHDD's HDD | /192.168.0.3:8080/hdd | HDDLUAddr |

Scenario 1—Source Selection: In this scenario, as depicted in FIG. 6, the user selects a source LU for viewing on the TV. This is an Immediate Unreserved type of connection. This scenario uses the make_connection command described above.

Step 1—User Selection of Source and Sink: The user accesses the TV's device selection interface and is presented with a list of source LUs (TuneDev 340 and HDD 350). The user can also select a sink LU (MainTV) 330. The user selects the TuneDev 340 as the source and MainTV 330 as the sink. At this point there are two options that the Controller 320 inside the TV has. The TV controller 320 can issue a make_connection request to the source LU or get a cntrol frame from the TuneDev LU 340.

The TV Controller 320 issues a make_connection request. As depicted in FIG. 6, the request is directed at the SrcLU named TuneDev 340 and specifies the MainTV 330 as the SnkLU. The TV Controller 320 is the owner and initiator of this connection request. The TV Controller 320 preferably issues the following command to the TuneDev 340 that preferably includes:

```
GET TunerLUAddr/make_connection<proctype>
?connID=ControllerLU/00001
&owner=ControllerLU
&initiator=ControllerLU
&src=TunerLU
&snk=DisplayLU
```

The SrcLU or TuneDev 340 preferably generates a response file to the OLU or Controller 320 indicating that the connection is pending. The response file preferably looks like this:

```
<make_connection>pending</make_connection>
<connID>ControllerLU/00001</connID>
```

Step 2—Source Connection to Sink: The SrcLU 340 determines which sub-device is available for the connection. In this example, this process is simple since there is only one sub-device to choose from. The SrcLU 340 will include the sub-device 342 information and the source stream type in the connection command and send the connection request to the SnkLU or MainTV 330. This command preferably looks like this:

```
GET DisplayLUAddr/make_connection<proctype>
?connID=ControllerLU/00001
&owner=ControllerLU
&initiator=ControllerLU
&src=TunerLU
&srcSD=Tuner
&snk=DisplayLU
&srcStreamType=MPEG2
```

Step 3—Sink LU Makes Connection: The SnkLU 330 receives the connection request, preferably checks if a stream type is specified in the command and confirms that SnkLU 330 is compatible with the specified format. In this example, the SnkLU 330 is compatible with MPEG2. The SnkLU 330 then determines which sub-device 332 it will use for this connection. In this example, the process is simple since there is only one sub-device 332 to choose from. The SnkLU 330 then checks the SrcLU sub-device 342 for compatibility. It determines that the SrcLU sub-device 342 is an AV/C device and that it knows how to make a connection to this source. It may perform additional checks as necessary at the AV/C level to prepare for the connection. The SnkLU 330 then makes an isochronous connection between the SrcLU sub-device 342 and the SnkLU sub-device 332 using commands specific to the underlying network protocols, e.g., 1394, AV/C, 61883 and the like, as necessary.

Upon a successful connection, the SnkLU 330 will create a results file and the response will be sent to the SrcLU 340. The response preferably looks like this:

```
<make_connection>succeeded</make_connection>
<connectionInfo>
<connID>ControllerLU/00001</connID>
<owner>ControllerLU<owner>
<initiator>ControllerLU<initiator>
<streamType>MPEG2</streamType>
<source>
   <logical_unit>TunerLU</logical_unit>
   <sub_device>Tuner</sub_device>
</source>
<sink>
   <logical_unit>DisplayLU</logical_unit>
   <sub_device>Monitor</sub_device>
</sink>
<recording>no</recording>
</connectionInfo>
```

The SnkLU 330 will generate a Connection Changed Notification to the OLU (Controller 320) indicating the status of the connection. The notification preferably looks like this:

```
GET <Notification-URL>?operation=ConnChanged
    &connID=ControllerLU/00001
    &reason=Success
```

Reservations: Reservations were not made for this connection prior to making the connection so no reservation information is available to be queried.

Service Banner: The MainTV LU 330 has now established a connection and the implementer of this TV would like to display the service banner UI from the SrcLU 340 that was just connected to the TV display 332. Internally, the MainTV LU 330 notifies the Controller LU 320 that the connection has been made and that the service banner UI should be displayed. The Controller LU 320 preferably issues the following command to the SrcLU 340 to obtain the service banner:

```
GET TunerLUAddr/service_banner<proctype>
    ?connID=ControllerLU/00001
    &sender=ControllerLU
```

The connectionID parameter uniquely identifies for the SrcLU 340 which connection the service banner should contain information for. If the SrcLU 340 supported more than one sub-device, this information is necessary to determine which sub-device service banner information should be displayed.

Control Frame: The user of the TV wants to display the control panel from the Cable Box. The TV provides some kind of UI to allow the user to instruct the TV to perform this request. The Controller LU 320 in the TV preferably issues the following command to the SrcLU to obtain the control frame:

```
GET TunerLUAddr/control_frame<proctype>
    ?connID=ControllerLU/00001
    &sender=ControllerLU
```

The connectionID parameter uniquely identifies for the SrcLU 340 which connection the control frame should contain information for. If the SrcLU 340 supported more than one sub-device, this information may be necessary to determine which sub-device specific control frame information should be displayed (if any).

Control of the SrcLU 340 using the control frame is determined by the implementer of the SrcLU 340. A user accessing the control frame where an action can cause a change in the content being sent to the SnkLU 340 follows the same rules as processing any command to the SrcLU. In other words, if the control frame is being displayed on the connection's Initiator LU then it honors a request to change the stream contents, but if the control frame is being displayed on a LU different from the connection's Initiator LU, then it follows its own rules for processing this request which may result in the request not being honored.

Key Initiated UI: There are some remote control keys that are received by LU that initiate a UI to be displayed to the user. One example is a GUIDE key which might initiate an Electronic Program Guide to be displayed to the user. Another example is an INFO key which might initiate a Channel Banner to be displayed to the user. This key initiated UI is implemented using a notification mechanism. For this example, the user presses the GUIDE key on the remote control and the key is sent to the SrcLU (TunerDev) 340 using a CEA931 command. The SrcLU 340 responds by sending a notification request to display its EPG UI. The SrcLU 340 sends the following notification request directed at the Notification URL for the LU who sent the key command:

```
GET <Notification-URL>?operation=NewWindow
    &URL=http://TunerLUAddr/EPG.cgi
```

The same control issues exist for this UI as for the UI in the Control Frame described previously.

Connection Query: Any LU on the network can query the connection status of other LUs on the network. For this example a LU on the network will send the connection query command to the TV SnkLU 330 requesting a list of all sink connections. The LU will request a list of all sink connections that the TV SnkLU 330 is involved with. The command preferably looks like this:

```
GET DisplayLUAddr/connection_query<proctype>
    ?srcsnk=Sink
```

The response file returned for this query preferably looks like this:

```
<connection>yes</connection>
<connectionInfo>
    <connID>ControllerLU/00001</connID>
    <owner>ControllerLU</owner>
    <initiator>ControllerLU</initiator>
    <streamType>MPEG2</streamType>
    <source>
        <logical_unit>TunerLU</logical_unit>
        <sub_device>Tuner</sub_device>
    </source>
    <sink>
        <logical_unit>DisplayLU</logical_unit>
        <sub_device>Monitor</sub_device>
    </sink>
    <recording>no</recording>
</connectionInfo>
```

Dropping the Connection: A connection may be dropped for a variety of reasons. These include (but are not limited to): the TV being turned off by the user, in which the MainTV LU 330 preferably drops the connection; the user selects a different source device for viewing on the MainTV LU 330; or another controller LU on the network initiates a connection to the MainTV LU 330. In this case, it is up to the implementer of the TV's MainTV LU 330 to decide if the MainTV LU will drop an existing connection initiated by the Controller LU inside the TV in favor of a connection request from a different initiator LU that is outside the TV.

For this scenario, the user will select a different source for viewing on the MainTV LU 330 so the connection request is initiated by the TV's Controller LU 320. When this connection request is received by the MainTV LU 330, it determines that the Initiator LU is indeed the Controller LU 320 inside the TV and it will honor the request. Since there is an existing connection, the connection is preferably deleted.

The deletion process starts by the MainTV LU 330 dropping the isochronous connection between itself and the SrcLU sub-device 342 using the appropriate network level commands, i.e., 1394, AV/C commands and the like. After this is successfully accomplished, it sends out a notification to the Owner LU, Initiator LU, and Source LU to reflect the change in connection status. If any of these LUs are the same LU then only one notification is required to be sent to a LU. The notification command preferably looks like this (one command for each LU to send the notification to):

```
GET <Notification-URL>?operation=ConnChanged
       &connID=ControllerLU/00001
       &reason=Dropped
```

All LUs involved in the connection will now use the information in the connection dropped notification to delete the connection from their internal connection database and the corresponding reservation from their reservation database. The MainTV LU 330 is now ready to complete the new connection request.

Scenario 2—User Source Selection: In this scenario, the user selects a source LU for viewing on the TV. This is an Immediate Unreserved type of connection. For this connection, the TV Controller 320 issues a control_frame request to the SrcLU 340 with the SnkLU 330 specified as a parameter in the command. Since the SrcLU 340 does not currently have a connection made to the specified SnkLU, it can take this as a suggestion to make the connection to the specified sink. The following steps will refer to the LUs and sub-devices illustrated in FIG. 6, but not the illustrated messages, commands, and the like.

Step 1—User Selection of Source and Sink: The user accesses the TV's device selection interface and is presented with a list of source LUs (TuneDev and HDD). The user can also select a sink LU (MainTV 330). The user selects the TuneDev 340 as the source and MainTV 330 as the sink. At this point there are two options that the controller inside the TV has. The TV controller 320 can issue a make_connection request to the source LU or get the Control Frame from the TuneDev LU 340.

TV Controller issues a control_frame request to the SrcLU 340 with the SnkLU 330 specified as a parameter in the command. This command preferably includes:

```
GET TunerLUAddr/control_frame<proctype>
       ?snk=DisplayLU
       &sender=ControllerLU
```

When the SrcLU 340 receives this command it realizes that it does not currently have a connection with the SnkLU 330 specified in the command. The SrcLU now has the choice to make a connection to the specified SnkLU and serve up the Control Frame or to go ahead and serve up the Control Frame without making the connection. In the Control Frame the SrcLU may present the option to the user to connect to the specified SnkLU. One way or another (for this example) the SrcLU determines that it will connect to the specified SnkLU.

Step 2—Source Connection to Sink: The SrcLU 340 determines which sub-device is available for the connection. In this example, this process is simple since there is only one sub-device to choose from. The SrcLU will include the sub-device 342 information and the source stream type in the connection command and send the connection request to the SnkLU. This command preferably looks like this:

```
GET DisplayLUAddr/make_connection<proctype>
       ?connID=TunerLU/00001
       &owner=TunerLU
       &initiator=ControllerLU
       &src=TunerLU
       &srcSD=Tuner
       &snk=DisplayLU
       &srcStreamType=MPEG2
```

Step 3—Sink LU Makes Connection: The SnkLU 330 receives the connection request and preferably checks if a stream type is specified in the command and that the SnkLU 330 is compatible with the specified format. In this example, the SnkLU is compatible with MPEG2. The SnkUU determines which sub-device it will use for this connection. In this example, the process is simple since there is only one sub-device to choose from. The SnkLU then checks the SrcLU sub-device for compatibility. It determines that the SrcLU sub-device is an AV/C device and that it knows how to make a connection to this source. It may perform additional checks as necessary at the AV/C level to prepare for the connection. The SnkLU will now make an isochronous connection between the SrcLU sub-device and the SnkLU sub-device using commands specific to 1394, AV/C, 61883 and the like as necessary.

Upon a successful connection, the SnkLU will create a results file and the response will be sent to the SrcLU as in Scenario 1.

The SnkLU 330 will generate a Connection Changed Notification to the ILU (Controller 320) indicating the status of the connection as in Scenario 1.

Reservations: Reservations are established by the SrcLU and SnkLU devices similar to the method used in Scenario 1, Reservations.

Service Banner: The Service Banner can be displayed using similar technique as described in Scenario 1, Service Banner.

Control Frame—The Control Frame can be displayed using similar technique as described in Scenario 1, Control Frame.

Key Initiated UI: The key initiated UI can be displayed using similar technique as described in Scenario 1, Key Initiated UI.

Connection Query: The Connection Query can be performed using similar technique as described in Scenario 1, Connection Query.

Dropping the Connection: The dropping of a connection can be performed using similar technique as described in Scenario 1, Dropping the Connection.

Figure 7:
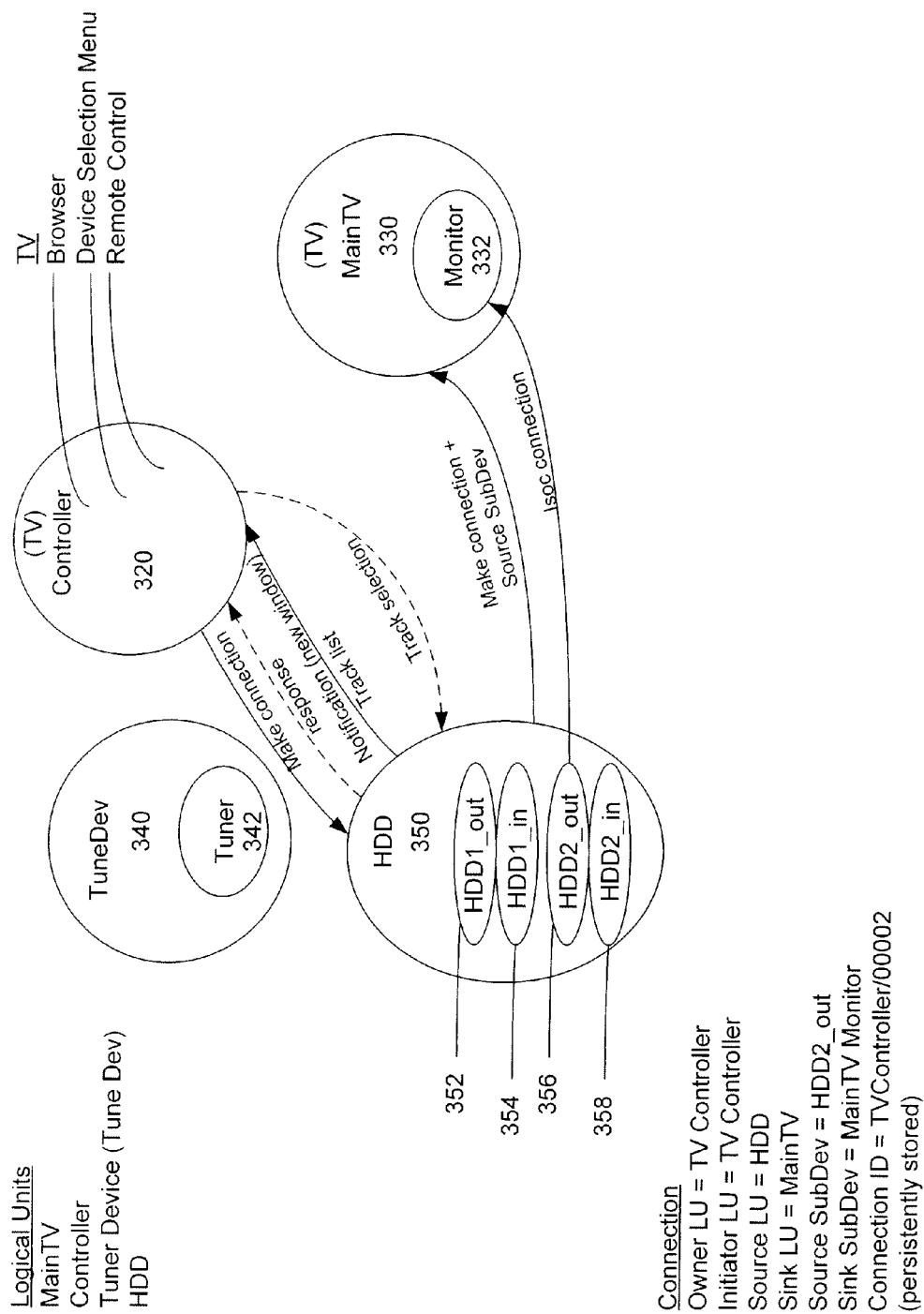
FIG. 7 shows a schematic that illustrates another connection scenario in accordance with a preferred embodiment.

Scenario 3—Complex Source Selection: In this scenario, the user selects a source LU for viewing on the TV. However, as depicted in FIG. 7, the source LU 350, a HDD LU, has multiple sub-devices and the connection cannot be completed until the user makes some choices to determine which sub-device will be used in the connection. This scenario, as further depicted in FIG. 8, will also address an example of a connection modification when the user makes a choice that causes the source sub-device to be changed.

Step 1—User Selection of Source and Sink: The user accesses the TV's device selection interface and is presented with a list of source LUs (TuneDev 340 and HDD 350). The user can also select a sink LU (MainTV 330). The user selects the HDD 350 as the source and MainTV 330 as the sink. As in Scenario 1, the controller 320 inside the TV has two options by issuing either the make_connection request or the control_frame request to the HDD LU 350. For this example the first option, make_connection, will be used. The request is directed at the SrcLU named HDD 350 and specifies the MainTV 330 as the SnkLU. The TV Controller LU 320 is the owner and initiator of this connection request. The TV Controller 320 preferably issues the following command to the HDD LU 350:

```
GET HDDLUAddr/make_connection<proctype>
?connID=ControllerLU/00002
&owner=ControllerLU
&initiator=ControllerLU
&src=HDDLU
&snk=DisplayLU
```

The SrcLU or HDD LU 350 preferably generates a response file to the OLU or Controller LU 320 indicating that the connection is pending. The response file preferably looks like this:

```
<make_connection>pending</make_connection>
<connID>ControllerLU/00002</connID>
```

Step 2—Source Connection to Sink: The SrcLU 350 supports two sub-devices. Because the user can select a track for playback from either sub-device, the HDD LU 350 requires input from the user to select a track for playback which determines the proper sub-device to use as a source for this connection. Instead of forwarding the connection request to the SnkLU 330 as in scenario 1, the SrcLU 350 will first use a notification mechanism to present a track list to the user. Once the user has selected a track to play, the SrcLU 350 can proceed with the connection process. The notification request is directed at the notification URL of the Initiator LU specified in the connection request, which preferably looks like this:

```
GET <Notification-URL>?operation=NewWindow
&URL=http:/HDDLUAddr/TrackList.cgi
```

The Initiator LU (Controller LU 320) will receive this notification request to open a new window and will then access the specified URL from the HDD LU 350 and display it in a browser window. The user then selects a track for playback. The web page will command the browser to close the window.

The track selected by the user for playback identifies for the SrcLU (HDD 350) which sub-device should be connected to the SnkLU 330. In this example the track selected for playback is located on Hard Disk B which is managed by the HDD LU 350 and has a sub-device named HDD2_Out 358. The connection command sent to the SnkLU 330 preferably includes:

```
GET DisplayLUAddr/make_connection<proctype>
?connID=ControllerLU/00002
&owner=ControllerLU
```

-continued

```
&initiator=ControllerLU
&src=HDDLU
&srcSD=HDD2_Out
&snk=DisplayLU
&srcStreamType=MPEG2
```

Step 3—Sink LU Makes Connection: The SnkLU 330 receives the connection request and preferably checks if a stream type is specified in the command and that SnkLU 330 is compatible with the specified format. In this example, the SnkLU 330 is compatible with MPEG2. The SnkLU 330 then determines which sub-device it will use for this connection. In this example, the process is simple since there is only one sub-device 332 to choose from. The SnkLU 330 then checks the SrcLU sub-device 358, HDD2_Out, for compatibility. It determines that the SrcLU sub-device 358 is an AV/C device and that it knows how to make a connection to this source. It may perform additional checks as necessary at the AV/C level to prepare for the connection. The SnkLU 330 then makes an isochronous connection between the SrcLU sub-device 358 and the SnkLU sub-device 332 using commands specific to the underlying network protocols, e.g., 1394, AV/C, 61883, and the like, as necessary.

Upon a successful connection, the SnkLU 330 will create a results file and the response will be sent to the SrcLU 350. The response preferably looks like this:

```
<make_connection>succeeded</make_connection>
<connectionInfo>
<connID>ControllerLU/00002</connID>
<owner>ControllerLU</owner>
<initiator>ControllerLU</initiator>
<streamType>MPEG2</streamType>
<source>
    <logical_unit>HDDLU</logical_unit>
    <sub_device>HDD2_Out</sub_device>
</source>
<sink>
    <logical_unit>DisplayLU</logical_unit>
    <sub_device>Monitor</sub_device>
</sink>
<recording>no</recording>
</connectionInfo>
```

The SnkLU 330 will generate a Connection Changed Notification to the OLU (Controller LU 320) indicating the status of the connection as in Scenario 1.

Reservations: Reservations are established by the SrcLU and SnkLU devices similar to the method used in Scenario 1, Reservations.

Service Banner: The Service Banner can be displayed using similar technique as described in Scenario 1, Service Banner.

Control Frame—The Control Frame can be displayed using similar technique as described in Scenario 1, Control Frame.

Figure 8:
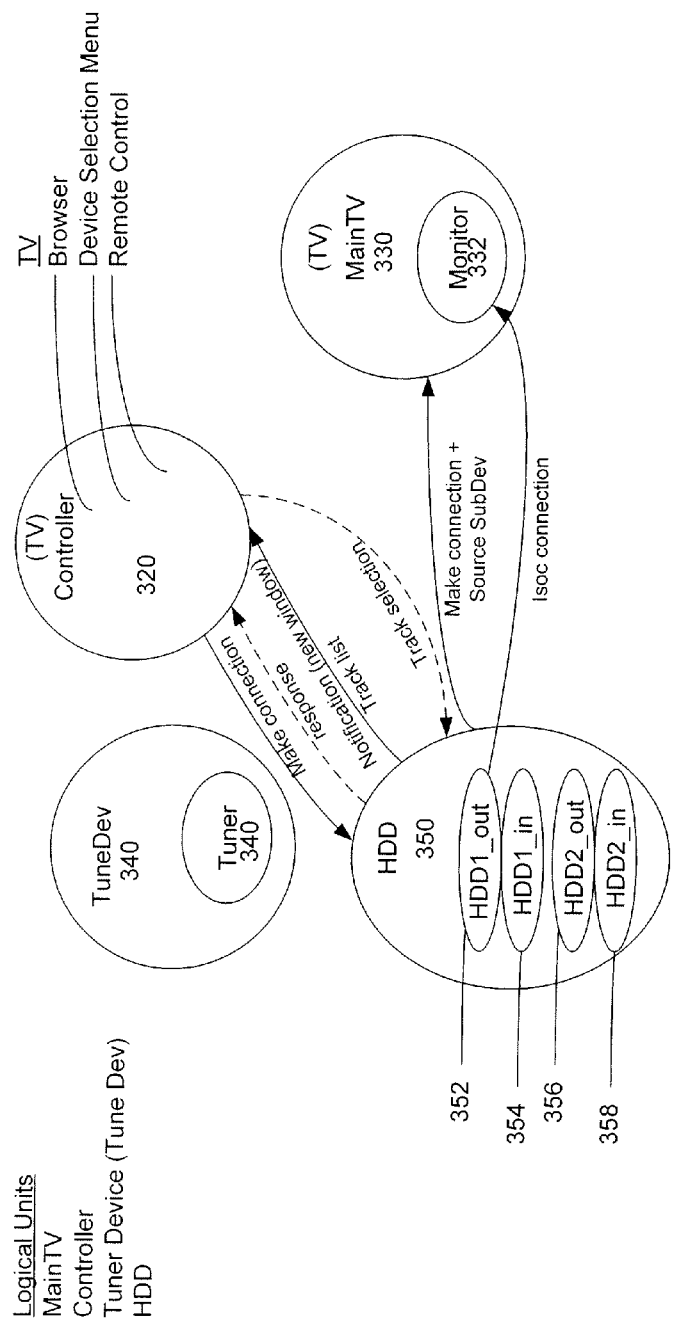
FIG. 8 shows a schematic that illustrates another connection scenario in accordance with a preferred embodiment.

New Track Selection by User: In addition, as depicted in FIG. 8, a user selection of a different track to play may result in the SrcLU 350 needing to modify the connection to use a different sub-device. For this example the user has selected a track for playback that resides on Hard Disk A. The SrcLU 350 needs to modify the connection before playing the track to connect the HDD1_Out sub-device 352 to the sink. The SrcLU 350 preferably issues the following command to make the modification:

```
GET DisplayLUAddr/make_connection<proctype>
?connID=ControllerLU/00002
&owner=ControllerLU
&initiator=ControllerLU
&src=HDDLU
&srcSD=HDD1_Out
&snk=DisplayLU
&srcStreamType=MPEG2
```

Since the connectionID in this command matches an existing connectionID, the SnkLU 330 will view this as a modification of an existing connection. As a result, the connection is dropped at the AV/C 1394 level and a new AV/C 1394 level connection is made between the new SrcLU sub-device 352 and the same SnkLU sub-device 332 that was used previously for this connectionID. After successful connection, the SnkLU 330 sends a response to the connection request. The SnkLU 330 then sends notification events to all LU participants in the connection to notify them of the change in the connection. The notification command is preferably includes:

```
GET <Notification-URL>?operation=ConnChanged
&connID=ControllerLU/00002
&reason=Modified
```

If the LUs that receive the notification are interested in what changed, they will use the query connection command to get the connection information.

Key Initiated UI: The key initiated UI can be displayed using similar technique as described in Scenario 1, Key Initiated UI. For an HDD type device, it might use the notification mechanism to display a transport/position slider for the user each time the transport state of the disc changes (each time play, FF, RW, pause keys are pressed).

Connection Query: The Connection Query can be performed using similar technique as described in Scenario 1, Connection Query.

Dropping the Connection: The dropping of a connection can be performed using similar technique as described in Scenario 1, Dropping the Connection.

Figure 10A:
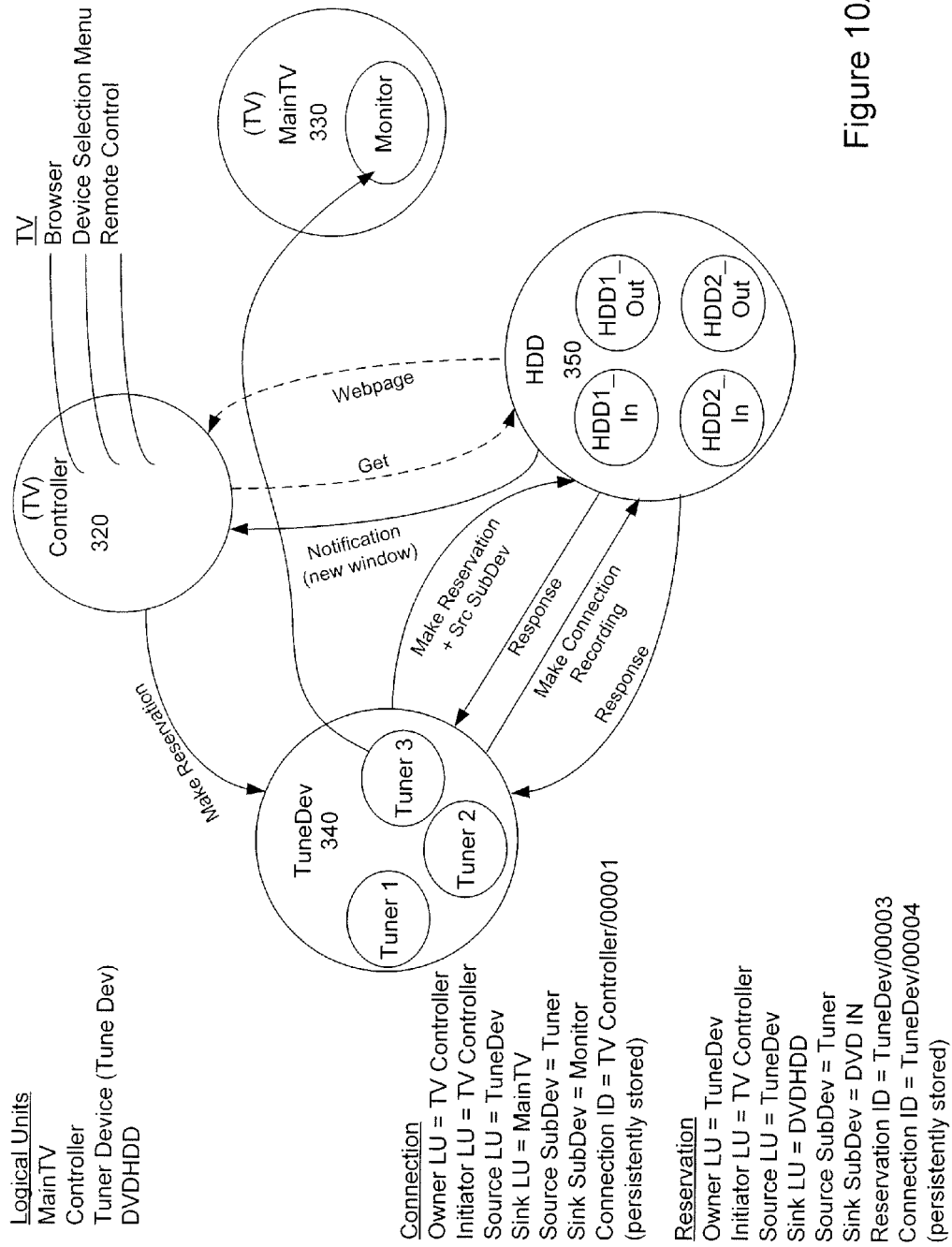
FIGS. 10A and 10B show schematics that illustrate alternative device configurations for the reservation scenario illustrated in FIG. 9.
Figure 10B:
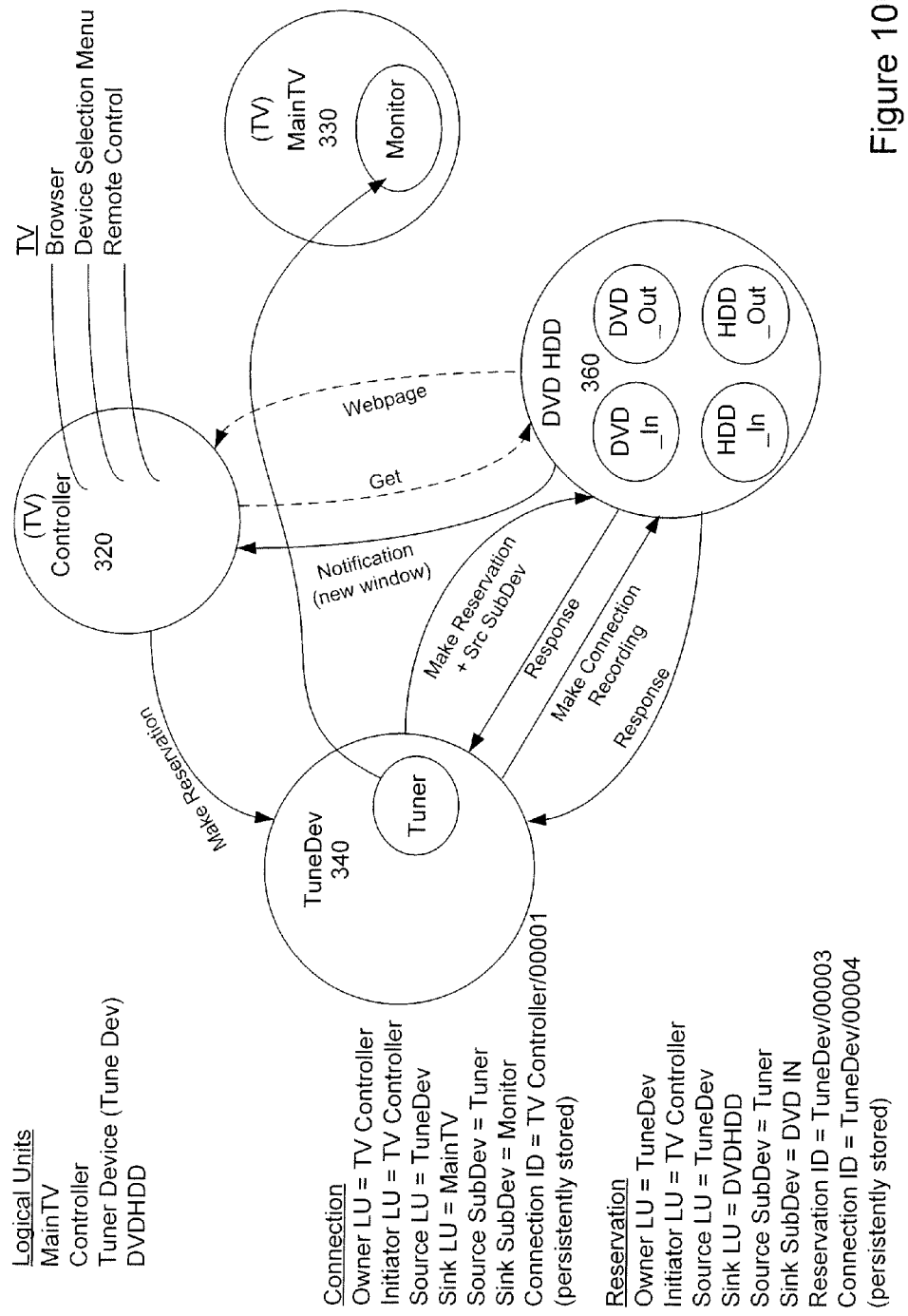

Scenario 4—Making an Immediate Recording: In this scenario, as depicted in FIG. 9, the user is presently in scenario 1 (see FIG. 6) watching the Cable Box on the TV. The user needs to record the remaining portion of the TV show for later viewing. This is an Immediate Known Duration connection. There are several ways that the user can initiate this recording action (through UI or Record Key), but regardless of how it is initiated, the Cable Box (SrcLU TuneDev) 340 will own the recording. In addition, the choice of a recording device is trivial in this example network since there is only 1 recording device type. If there were multiple recording devices types, as depicted in FIG. 10 where the HDD LU 350 is replaced by a DVD HDD LU 360, then the TuneDev LU 340 would need to provide some kind of UI to allow the user to choose which recording device type to record to.

Step 1—Make Reservations: To start the recording, the SrcLU issues a reservation request to the HDD LU 350. For this example, the current date/time and remaining duration of the program are assumed to be Sep. 1, 2005 at 8:20 pm and 40 minutes. This request preferably looks like this:

```
GET HDDLUAddr/make_reservation<proctype>
?resID=TunerLU/00003
&owner=TunerLU
&initiator=ControllerBrowserLU
&srcsnk=Sink
&type=Immediate
&startDate=9/1/2005
&startTime=20:20:00
&duration=00:40:00
&streamType=MPEG2
&record=YES
```

The HDD LU 350 receives this command a checks this reservation against other reservations that are stored in its reservation database. It determines that there are no conflicts. It checks the stream type since it was included in the parameter list with the command. The MPEG2 stream type is supported so there is no problem with the reservation. The HDD 350 is not required to make a decision on the specific sub-device at this time unless it wants to do so. The response to this request preferably includes:

```
<make_reservation>succeeded</make_reservation>
<reservationInfo>
<resID>TunerLU/00003</resID>
<owner>TunerLU</owner>
<initiator>ControllerLU</initiator>
<status>Ready</status>
<srcsnk>sink</srcsnk>
<startDate>9/1/2005</startDate>
<startTime>20:20:00</startTime>
<duration>00:40:00</duration>
<record>yes</record>
</reservationInfo>
```

The TuneDev LU 340 will then make an entry in its own reservation database for the recording.

Step 2—Make Recording Connection: Since this is an immediate recording, the TuneDev LU 340 will now make the connection for the recording. It will preferably issue the following command to the HDD LU 350:

```
GET HDDLUAddr/make_connection<proctype>
?connID=TunerLU/00004
&resID=TunerLU/00003
&src=TunerLU
&srcSD=Tuner
&snk=HDDLU
&srcStreamType=MPEG2
```

The HDD LU 350 compares the reservationID to all the reservationIDs of existing reservations. In this case it finds a match with the reservation that was made. Since the HDD LU 350 had not previously made a decision on the sub-device to use for the recording, it now preferably determines which sub-device is available for the recording connection. Since both sub-devices are currently available, the HDD LU 350 may look at the amount of free space available on the two discs. The one with the largest amount of free space will preferably be selected as the recording sub-device for this connection. In this example, Hard Disk A has the most free space and, thus, Sub-device HDD1_In 352 will be used. The HDD LU 350 also checks for the type of sub-device specified as the source for this connection and verifies that it is an AV/C device so it knows how to connect to the source sub-device.

The HDD LU 350 then makes an isochronous connection between the SrcLU sub-device 342 specified in the connection request and the HDD LU HDD1_In sub-device 352 using commands specific to the underlying network protocols, e.g., 1394, AV/C, 61883 and the like, as necessary. After a successful connection, the HDD LU 350 preferably returns a response file for the connection request. It preferably looks like this:

```
<make_connection>succeeded</make_connection>
<connectionInfo>
<connID>TunerLU/00004</connID>
<resID>TunerLU/00003</resID>
<owner>TunerLU</owner>
<initiator>ControllerLU</initiator>
<streamType>MPEG2</streamType>
<source>
   <logical_unit>TunerLU</logical_unit>
   <sub_device>Tuner</sub_device>
</source>
<sink>
   <logical_unit>HDDLU</logical_unit>
   <sub_device>HDD1_In</sub_device>
</sink>
<recording>yes</recording>
</connectionInfo>
```

Upon receipt of a successful connection, the TuneDev LU 340 will make a connection entry in its connection database.

Step 3—Start the Recording: The TuneDev LU 340 is preferably required to start the recording. It preferably issues a CEA931 deterministic Record command. The command preferably looks like this:

```
GET HDDLU/CEA931
?record_function
&connID=TunerLU/00004
&cmdOwner=TunerLU
&srcsnk=Sink
```

The HDD LU 350 then begins recording and preferably responds with "X-CEA931-Response: ACCEPTED" in the HTTP response header.

The HDD LU 350 then preferably requests the program information from the OLU (TuneDev 340) of the connection. This command request preferably looks like the following:
GET TunerLUAddr/program_info<proctype>?connID=TunerLU/00004

This results in the OLU (the TuneDev LU 340 in this case) returning a file containing the program information for the recording. In general, for a recording, the program information command is preferably issued to the OLU of a connection first. If the request fails, the request is then preferably sent to the SrcLU, which in this case is the same.

Control Priority: Now that the TuneDev LU 340 has started a recording from its Tuner sub-device 342, its important that the recording not be disrupted by a channel change from the user or from any other controller on the network. The TuneDev 340 preferably shuffles the connection priority so the recording connection is higher priority than the non-recording connection from the Tuner sub-device 342 to the Monitor sub-device 332 (TV). The TuneDev LU 340 preferably also imposes a rule on itself that it will only accept commands from the owner of the highest priority connection for the Tuner sub-device 342 and even then it preferably will not accept key based commands (like channel up or down that would come from a user), but only deterministic commands (like the tune_function). In this case, the owner of the highest priority connection is the TuneDev LU 340 itself. This advantageously effectively locks out other controllers on the network from accidentally changing the channel and causing a loss of the intended recording.

Likewise, the HDD LU 350 will prioritize control so that it will only accept control commands from the owner of the recording connection. This prevents other controllers from inadvertently stopping or pausing a recording.

Since the user is still watching the program on the TV, it is possible for the user to access the UI of the TuneDev 340 that may result in the user attempting to change channels. The TuneDev UI implementation preferably does not allow the recording to be disrupted by allowing the channel to be changed. It preferably provides appropriate information to the user through the UI to indicate what is going on.

Stopping the Recording: The TuneDev LU 340 is responsible for maintaining the timing of the recording connection and terminating the connection when the duration has expired. When the duration expires, the TuneDev LU 340 preferably issues a stop command to the HDD LU 350 to stop the recording. The command preferably looks like this:

```
GET HDDLUAddr/CEA931
?stop_function
&connID=TunerLU/00004
&cmdOwner=TunerLU
&srcsnk=Sink
``` and the HDD LU 350 preferably responds with an accepted response.

The TuneDev LU 340 then drops the recording connection. Dropping a connection is always done by the sink device so the TuneDev LU 340 will send the drop connection request to the HDD LU 350. The command preferably looks like this:

```
GET HDDLUAddr/drop_connection<proctype>
?connID=TunerLU/00004
```

The deletion process starts by the HDD LU 350 dropping the isochronous connection between itself and the SrcLU sub-device 342 using the appropriate network level command, e.g., 1392, AV/C and the like. After this is successfully accomplished, HDD LU 350 first sends out the response to the connection drop request. The response file preferably looks like this:

```
<drop_connection>succeeded</drop_connection>
<connID>TunerLU/00004</connID>
```

The HDD LU 350 then sends out a notification to the Owner LU (TuneDev 340), Initiator LU (Controller 32), and Source LU (TuneDev340) to reflect the change in connection status. If any of these LUs are the same LU then only one notification is required to be sent to a LU. The notification command preferably looks like this (one command for each LU to send the notification to):

```
GET <Notification-URL>?operation=ConnChanged
&connID=TunerLU/00004
&reason=Dropped
```

The HDD LU 350 has completed the recording and dropping the connection. The TuneDev LU 340 still has a connection to the TV that was never dropped so that connection is now the highest (and only) priority connection so control of the TuneDev LU sub-device Tuner 342 returns to the owner and initiator LUs (i.e., Controller 320) for that connection.

Scenario 5—Making a Time Delayed Recording: In this scenario referring again to FIG. 9, the user is again presently in Scenario 1 (see FIG. 6) watching the Cable Box on the TV. The user accesses the program guide UI of the TuneDev LU 340 and sets up a recording for some time in the future. The user is given a choice of recording device and selects the HDD to make the recording to. This is referred to as a Delayed Known Duration connection for the purpose of making a recording.

Step 1—Make Reservations: As soon as the user selects the recording device, the TuneDev LU 340 will make a reservation with the HDD LU 350 for the recording. For this example, the program to be recorded is broadcast on Sep. 2, 2005 at 9:00 pm and the duration of the program is 1 hour. This request preferably looks like this:

```
GET HDDLUAddr/make_reservation<proctype>
?resID=TunerLU/00005
&owner=TunerLU
&initiator=ControllerLU
&srcsnk=Sink
&startDate=09/02/2005
&startTime=21:00:00
&duration=01:00:00
&streamType=MPEG2
&record=YES
```

(For this Scenario the ResID and ConnID are Noted in the Text as the Next Sequential Number.)

The HDD LU 350 receives this command and checks this reservation against other reservations that are in its reservation database. It determines that there are no conflicts. It checks the stream type since it was included in the parameter list with the command and confirms it is supported so there is no problem with the reservation. The HDD is not required to make a decision on the specific sub-device at this time unless it wants to do so. The response to this request preferably is as follows:

```
<make_reservation>succeeded</make_reservation>
<reservationInfo>
<resID>TunerLU/00005</resID>
<owner>TunerLU</owner>
<initiator>ControllerLU</initiator>
<status>Ready</status>
<srcsnk>sink</srcsnk>
<startDate>09/2/2005</startDate>
<startTime>21:00:00</startTime>
<duration>01:00:00</duration>
<record>yes</record>
</reservationInfo>
```

The TuneDev LU 340 then makes an entry in its own reservation database for the recording.

Step 2—Reservation Query: The reservations can be queried from any LU. The reservation query command directed at the SrcLU 340 for this reservation would look like this:

```
GET TunerLUAddr/query_reservation<proctype>
?resID=TunerLU/00005
```

The SrcLU would return the following response file:

```
<reservation>yes</reservation>
<reservationInfo>
<resID>TunerLU/00005</resID>
<owner>TunerLU</owner>
<initiator>ControllerLU</initiator>
<status>Ready</status>
<srcsnk>source</srcsnk>
<startDate>09/02/2005</start>
<startTime>21:00:00</startTime>
<duration>01:00:00</duration>
<record>yes</record>
</reservationInfo>
```

Step 3—Make Recording Connection: The TuneDev 340 will wait until the start time of the reservation and then make the connection for the recording. Either before or after the connection, it will tune to the channel that is to be recorded. It will preferably issue the following command to the HDD LU 350:

```
GET HDDLUAddr/make_connection<proctype>
?connID=TunerLU/00006
&resID=TunerLU/00005
&src=TunerLU
&srcSD=Tuner
&snk=HDDLU
&srcStreamType=MPEG2
```

The HDD LU 350 compares the reservationID to all the reservationIDs of existing reservations. In this case it finds a match with the reservation that was made. If the HDD LU 350 had not previously made a decision on the sub-device to use for the recording, it now preferably determines which sub-device is available for the recording connection. Since both sub-devices are currently available, the HDD LU 350 may look at the amount of free space available on the two discs. The one with the largest amount of free space is preferably selected as the recording sub-device for this connection. In this example, Hard Disk B has the most free space and will be used. The HDD LU 350 also checks for the type of sub-device specified as the source for this connection and verifies that it is an AV/C device so it knows how to connect to the source sub-device. The HDD LU 350 then makes an isochronous connection between the SrcLU sub-device specified in the connection request and the HDD LU sub-device, HDD2_In 356, using commands specific to the underlying network protocols, e.g., 1394, AV/C, 61883, and the like, as necessary. After a successful connection, the HDD LU 350 preferably returns a response file for the connection request. It preferably looks like this:

```
<make_connection>succeeded</make_connection>
<connectionInfo>
<connID>TunerLU/00006</connID>
<resID>TunerLU/00005</resID>
<owner>TunerLU</owner>
<initiator>ControllerLU</initiator>
<streamType>MPEG2</streamType>
<source>
  <logical_unit>TunerLU</logical_unit>
  <sub_device>Tuner</sub_device>
</source>
<sink>
  <logical_unit>HDDLU</logical_unit>
  <sub_device>HDD2_In</sub_device>
</sink>
</connectionInfo>
```

Upon receipt of a successful connection, the TuneDev LU 340 will make a connection entry in its connection database.

Step 4—Start the Recording: The TuneDev LU 340 preferably is required to start the recording. It preferably issues a CEA931 deterministic Record command. The command preferably looks like this:

```
GET HDDLUAddr/CEA931
?record_function
&connID=TunerLU/00006
&cmdOwner=TunerLU
&srcsnk=Sink
```

The HDD LU 350 then begins recording and preferably responds with "X-CEA931-Response: ACCEPTED" in the HTTP response header. A short time later the HDD LU 350 then preferably requests the program information from the OLU (TuneDev 340) of the recording connection. This command request preferably looks like the following:

GET TunerLUAddr/program_info<proctype>?connID=TunerLU/00006

This results in the OLU (the TuneDev LU 340 in this case) returning a file containing the program information for the recording.

Control Priority: The Control Priority can be performed using the same technique as described in Scenario 4, Control Priority.

Stopping the Connection: The stopping of a connection can be performed using similar technique as described in Scenario 4, Stopping the Connection.

Scenario 6—Time Shift Viewing (See FIG. 11):

Step 1—User Selection of Source and Sink: The user accesses the TV's device selection interface and is presented with a list of source LUs (TuneDev 340 and HDD 350). The user can also select a sink LU (MainTV) 330. The user selects the TuneDev 340 as the source and MainTV 330 as the sink. In this example, the user has previously configured the TV to request that TSV connections be specified so the TV Controller 320 will scan through its list of LUs and find that the HDD LU 350 supports the TSV functionality and will use this LU in the connection request to the SrcLU.

The TV Controller 320 is responsible for managing the TSV connections. There are two connections involved, one for the TSV recording between the SrcLU and the TSVLU and one for the TSV playback between the TSVLU and the SnkLU.

The TV Controller 320 issues a make_connection request to establish the TSV recording connection. The request is directed at the SrcLU, in this case the TuneDev 340, and specifies the HDD LU 350 as the SnkLU. The TV Controller 320 is the owner and initiator of this connection request and the TSV tag is included as a parameter in the command. The TV Controller 320 preferably issues a command to the TuneDev LU that includes:

```
GET TunerLUAddr/make_connection<proctype>
?connID=ControllerLU/00007
&owner=ControllerLU
&initiator=ControllerLU
&src=TunerLU
&snk=HDDLU
&tsvEnable=yes
```

The SrcLU 340 preferably generates a response file to the OLU 320 indicating that the connection is pending. The response file preferably looks like this:

```
<make_connection>pending</make_connection>
<connID>ControllerLU/00007</connID>
```

Step 2—Source Connection to TSVLU: The SrcLU 340 determines which sub-device is available for the connection. In this example, this process is simple since there is only one sub-device to choose from. The SrcLU 340 will include the sub-device 342 information and the source stream type in the connection command. This command looks like this:

```
GET HDDLUAddr/make_connection<proctype>
?connID=ControllerLU/00007
&owner=ControllerLU
&initiator=ControllerLU
&src=TunerLU
&srcSD=Tuner
&snk=HDDLU
&srcStreamType=MPEG2
&tsvEnable=yes
```

The SnkLU 350 finds the TSV enable flag in the command and now preferably determines which sub-device is available for the TSV recording and playback connections. There preferably is an input and output sub-device available that share common media for both functions. In this example, Hard Disk A will be used. The SnkLU 350 also checks for the type of sub-device specified as the source for this connection and verifies that it is an AV/C device so it knows how to connect to the source sub-device. The SnkLU 350 will now make an isochronous connection between the SrcLU sub-device 342 and the SnkLU sub-device 352 using commands specific to 1394, AV/C, and 61883 as necessary.

Upon a successful connection, the SnkLU 350 will create a results file and the response will be sent to the SrcLU 340. The response preferably looks like this:

```
<make_connection>succeeded</make_connection>
<connectionInfo>
<connID>ControllerLU/00007</connID>
<owner>ControllerLU<owner>
<initiator>ControllerLU<initiator>
```

```
<streamType>MPEG2</streamType>
<source>
  <logical_unit>TunerLU</logical_unit>
  <sub_device>Tuner</sub_device>
</source>
<sink>
  <logical_unit>HDDLU</logical_unit>
  <sub_device>HDD1_In</sub_device>
</sink>
<tsvEnable>yes</tsvEnable>
<recording>no</recording>
</connectionInfo>
```

The <recording> tag indicates a No for recording because this is a TSV enabled connection and not a reserved recording connection so it does not conform to being a normal recording. However, the TSVLU 370 has knowledge that it is the SnkLU of a TSV connection and it will implement special TSV operational behavior to support this connection. First, it preferably automatically starts a TSV recording (implementation specific) of the stream from the source. It preferably only responds to the TSV Restart command for this recording, no pause or stop is supported. It will record until the connection is lost or dropped. If there is an existing TSV playback connection associated with this TSV recording connection, playback shall automatically restart from the TSV recording track.

The SnkLU 350 will generate a Connection Changed Notification to the OLU indicating the status of the connection. The command preferably looks like this:

```
GET <Notification-URL>?operation=ConnChanged
    &connID=ControllerLU/00007
    &reason=Success
```

Step 3—TSVLU Connection to Sink: Now the TV Controller 320 will make the second leg of the TSV connection by connecting the TSVLU 370 to the SnkLU 330. For this second leg of the connection, a new parameter specifying the TSV recording connection ID is added to the connection command. The TSV Connection ID is the Connection ID used in the TSV recording connection between the SrcLU and the TSVLU 370. This allows the TSVLU 370 to relate the playback connection to the recording connection. This command preferably looks like this:

```
GET HDDLUAddr/make_connection<proctype>
    ?connID=ControllerLU/00008
    &owner=ControllerLU
    &initiator=ControllerLU
    &src=HDDLU
    &snk=DisplayLU
    &srcStreamType=MPEG2
    &tsvEnable=yes
    &tsvConnID=ControllerLU/00007
```

The SrcLU, which in this case is also HDD 350, preferably generates a response file to the OLU indicating that the connection is pending. The response file preferably looks like this:

```
<make_connection>pending</make_connection>
<connID>ControllerLU/00008</connID>
```

The TSVLU 370 (HDD LU 350) will receive this command request and determine the proper sub-device to be used for the connection. Since the command specifies that this is a TSV connection and the TSVLU 370 is the source of this connection, it looks for the TSV Connection ID which links this connection to the TSV recording connection that was made previously. The TSVLU 370 uses this information to determine that the sub-device to be used in this connection is HDD1_Out 354. The connection command preferably looks like this:

```
GET DisplayLUAddr/make_connection<proctype>
    ?connID=ControllerLU/00008
    &owner=ControllerLU
    &initiator=ControllerLU
    &src=HDDLU
    &srcSD=HDD1_Out
    &snk=DisplayLU
    &srcStreamType=MPEG2
    &tsvEnable=yes
    &tsvConnID=ControllerLU/00007
```

The SnkLU 330 receives the connection request and checks if a stream type is specified in the command and that it is compatible with the specified format. Then the SnkLU 330 needs to determine which sub-device it will use for this connection. In this example, the process is simple since there is only one sub-device 332 to choose from. The SnkLU 330 then checks the SrcLU sub-device 354 for compatibility. It determines that the SrcLU sub-device 354 is an AV/C device and that it knows how to make a connection to this source. It may perform additional checks as necessary at the network level to prepare for the connection. The SnkLU 330 will now make an isochronous connection between the SrcLU sub-device HDD1_Out 354 and the SnkLU sub-device 332 using commands specific to network protocols, e.g., 1394, AV/C, 61883, and the like, as necessary.

Upon a successful connection, the SnkLU 330 will create a results file and the response will be sent to the SrcLU. The response preferably looks like this:

```
<make_connection>succeeded</make_connection>
<connectionInfo>
<connID>ControllerLU/00008</connID>
<owner>ControllerLU<owner>
<initiator>ControllerLU<initiator>
<streamType>MPEG2</streamType>
<source>
  <logical_unit>HDDLU</logical_unit>
  <sub_device>HDD1_Out</sub_device>
</source>
<sink>
  <logical_unit>DisplayLU</logical_unit>
  <sub_device>Monitor</sub_device>
</sink>
<tsvEnable>yes</tsvEnable>
<tsvConnID>ControllerLU/00007</tsvConnID>
<recording>no</recording>
</connectionInfo>
```

The SnkLU 330 preferably generates a Connection Changed Notification to the OLU (Controller 320) indicating the status of the connection. The command preferably looks like this:

```
GET <Notification-URL>?operation=ConnChanged
    &connID=ControllerLU/00008
    &reason=Success
```

The TSVLU 370 has knowledge that it is the source of a TSV connection. Using the TSV Connection ID, it knows the TSV recording track that should be played back on this connection. The TSVLU 370 is preferably required to automatically start playback of the TSV recording track from the beginning.

User Key Routing: The routing of keys (via CEA931) from the user to the TSVLU 370 or the SrcLU, such as transport keys and keys relating to disc type operations (Play, FF, RW, Pause, Skip Forward, Skip Backward, Skip Next, Return to Live, Return to Beginning) are preferably directed at the TSVLU 370 to control playback of the TSV stream. All other keys, including Record, would be directed at the SrcLU 340. The CEA931 commands listed in the data file may be used to assist in directing keys to one LU or the other.

Channel Change: In this step of the scenario, the user has pressed the Channel Up key on the remote. The controller 320 in the TV receives this key and sends it to the SrcLU 340 via CEA931. The command preferably looks like this:

```
GET /TunerLUAddr/CEA931?channel_up&press
    &connID=ControllerLU/00007
    &cmdOwner=ControllerLU
    &srcsnk=src
```

The SrcLU 340 will receive this command and perform the channel change after verifying that the command has passed the command priority processing. At the same time as the channel change, the SrcLU 340 issues a Stream Changed notification to the OLU of the connection(s) whose channel has changed. The notification command preferably looks like this:

```
GET <Notification-URL>?operation=StreamChanged
    &connID=ControllerLU/00007
```

In this example, the TV's Controller 320 receives the notification as the OLU of the connection. When it receives the notification it will realize that this is from the source of a TSV recording connection and issues the TSVRestart command to the TSVLU 370 so it will restart the recording loop and handle the playback issues as well. The command preferably looks like this:

```
GET HDDLUAddr/tsv_restart<proctype>
    &connID=ControllerLU/00007
    &cmdOwner=ControllerLU
```

The TSVLU 370 will receive this command and performs the TSV Restart function.

HDD Taken Off Network: For the purposes of this step in the scenario, the HDD drops off the network leaving the Cable Box and the TV on the network. When the HDD dropped off the network, a bus reset is generated. The sink devices involved in the two TSV connections attempt to restore the connections but they fail since the HDD is no longer on the network with the other two devices. For the TSV recording connection between the TunerDev LU 340 and the HDD LU 350, the TunerDev LU 340 knows that the connection has been dropped at the AV/C level and realizes that the HDD LU 350 is no longer on the network. The TuneDev LU 340 as a source would normally not be required to generate the Connection Changed notification but since the SnkLU 350 for this connection is no longer on the network, the TuneDev LU 340 is responsible for generating the Connection Changed notification to the OLU and ILU. This notification command issued by the TuneDev LU 340 preferably looks like this:

```
GET <Notification-URL>?operation=ConnChanged
    &connID=ControllerLU/00007
    &reason=Lost
```

The HDD LU 350 was taken off the network so, when it sees the loss of the sink connection, the TuneDev LU 340 has no one to notify so it has no action to take other than to remove the connection from its internal connection database.

The MainTV LU 330 in the TV will also know that the connection for the second leg of the TSV connection between the HDD LU 350 and the MainTV LU 330 has been lost at the AV/C level and will generate the Connection Changed notification to the LUs that are still on the network. The notification command issued by the SnkLU 330 to the OLU and ILU and preferably looks like this:

```
GET <Notification-URL>?operation=ConnChanged
    &connID=ControllerLU/00008
    &reason=Lost
```

When it sees the loss of the source connection and realizes that the HDD LU 350 was taken off the network, the MainTV LU 330 (the sink) takes on the responsibility to notify the OLU and ILU of the lost connection. Since those devices are also absent from the network, it has no one to notify so it has no action to take other than to remove the connection from its internal connection database.

The SnkLU 330 is now left without a connection to feed a stream to the Display. The SnkLU 330 may choose to display a message to the user that the source connection has been lost. This may prompt the user to select a new source. Alternatively, since the owner of the lost connection was the Controller in the TV, it may chose to automatically connect the TuneDev LU 340 directly to the MainTV LU 330 since it knows that both LUs are still on the network. For this example, the TV Controller preferably chooses to restore the last connection that the user asked for since the SrcLU 340 is still present on the network. This command preferably looks like this:

```
GET TunerLUAddr/make_connection<proctype>
    ?connID=ControllerLU/00009
    &owner=ControllerLU
    &initiator=ControllerLU
    &src=TunerLU
    &snk=DisplayLU
```

The SrcLU 340 will generate a response file to the OLU indicating that the connection is pending. The response file preferably looks like this:

```
<make_connection>pending</make_connection>
<connID>ControllerLU/00008</connID>
```

The SrcLU 340 will forward the connection request to the SnkLU 330 after determining and adding the source sub-device parameter to the command. This command preferably looks like this:

```
GET TunerLUAddr/make_connection<proctype>
    ?connID=ControllerLU/00009
    &owner=ControllerLU
    &initiator=ControllerLU
    &src=TunerLU
    &srcSD=Tuner
    &snk=DisplayLU
    &srcStreamType=MPEG2
```

The TSV information is absent from the command since there is no TSV device available on the network. The SnkLU 330 will preferably respond with the following preferable response file:

```
<make_connection>succeeded</make_connection>
<connectionInfo>
<connID>ControllerLU/00009</connID>
<owner>ControllerLU<owner>
<initiator>ControllerLU<initiator>
<streamType>MPEG2</streamType>
<source>
    <logical_unit>TunerLU</logical_unit>
    <sub_device>Tuner</sub_device>
</source>
<sink>
    <logical_unit>DisplayLU</logical_unit>
    <sub_device>Monitor</sub_device>
</sink>
<recording>no</recording>
</connectionInfo>
```

The SnkLU 330 will generate a Connection Changed Notification to the OLU indicating the status of the connection. The command preferably looks like this:

```
GET <Notification-URL>?operation=ConnChanged
    &connID=ControllerLU/00009
    &reason=Success
    HDD Becomes Available
```

The HDD re-connected to network: Reconnection of the HDD generates a bus reset and the TV Controller 320 notes that a TSV device (the HDD) has appeared on the network. It knows that it owns a connection established between the TuneDev LU 340 and the MainTV LU 330 and that this is a connection where the TSV functionality had been requested. The TV Controller 320 preferably maintains the current connection between the SrcLU 340 and SnkLU 330. The next time the user selects a source for connection to the TV's MainTV LU 330, it will make connections to support TSV. The TV Controller 320 alternatively makes the TSV connection immediately or at the next channel change.

Reserved Recording Interrupts TSV Recording: For the purposes of this step of the scenario, the HDD LU 350 only has two sub-devices (HDD1_In and HDD1_Out) present on the network. The second hard drive, Hard Disk B (with sub-devices HDD2_In and HDD2_Out) was removed from the network. The active TSV connections are those active at the end of Step 3.

For this step in the scenario, a recording has been set up to start at 8:00 pm from the TuneDev LU 340 to the HDD LU 350 for 1 hour. At 8:00 pm the user is watching delayed from live by 10 minutes. The TuneDev LU 340 initiates the connection for the recording with the HDD LU 350 which is also providing the TSV function that is currently active. When the HDD LU 350 receives the connection command with the reservation specified, it preferably drops the TSV recording connection to honor the reserved connection request because it does not have the resources to support both the TSV recording and the normal reserved recording. The HDD LU 350 will drop the TSV recording connection and send the drop connection notification to the SrcLU, SnkLU 330, OLU, and ILU. This command preferably looks like this:

```
GET <Notification-URL>?operation=ConnChanged
    &connID=ControllerLU/00007
    &reason=Dropped
```

The TV Controller LU 320 (OLU and ILU) receives this notification and realizes that the TSV recording has stopped but that the secondary connection for playback of the TSV recording is still present. The TV Controller LU 320 preferably waits for the playback of the TSV recording to come to an end indicating that the user has completed the playback of the TSV recording before terminating the TSV playback connection to the SnkLU 330. The TSVLU 370 preferably generates the following notification event to the OLU when playback of the TSV recording is stalled (paused at the end of the track):

```
GET <Notification-URL>?operation=TSVPlaybackStalled
    &connID=ControllerLU/00008
```

Alternatively, the TV Controller 320 can 1) notify the user that the TSV operation is no longer available. When the playback of the TSV recording reaches its end, the user will understand what has happened. The TV Controller LU may bring up the Device Selection screen prompting the user to select another source. 2) search for another TSV enabled LU to use for the TSV connection. If available, it could start up a TSV recording connection and wait for the TSV playback connection to reach its end. Then it would switch over to the new TSVLU 370 to begin playback of the new TSV recording. Or 3) query the SrcLU for the source connections and discover if there is a connection from the SrcLU and sub-device that was in use for the TSV recording connection. If a connection is found, it could determine if the connection is to a TSV enabled recording device and, if so, attach a TSV playback connection to this reserved recording when the current TSV playback is complete. If not found or there is no TSV enabled recording device connected to the SrcLU and sub-device, the TV Controller 320 would fall back to one of the other options listed here. TSV Playback of Normal Recording: As described in the previous step, the TV Controller LU 320 will query the SrcLU 340 for its list of source connections so it can determine if the SrcLU and sub-device that was used in the TSV connection is in use with a TSV enabled recording device. The TV Controller 320 is able to determine that the SrcLU and sub-device that was in use for the TSV connection is in use for a recording connection to the TSV enabled HDD LU 350. It decides to attach a TSV playback connection to this recording. The recording connection ID discovered from the query is TunerLU/00010

The start time and duration of the recording is discovered from the connection query also. This information can be used to determine when the HDD LU 350 might be available again for starting up a TSV recording connection with the SrcLU 340.

The TV Controller 320 LU attaches a connection to the recording as described above. The connection command preferably looks like this:

```
GET HDDLUAddr/make_connection<proctype>
?connID=ControllerLU/00008
&owner=ControllerLU
&initiator=ControllerLU
&src=HDDLU
&snk=DisplayLU
&srcStreamType=MPEG2
&tsvEnable=yes
&tsvConnID=TunerLU/00007
```

The SrcLU generates a response file to the OLU indicating that the connection is pending. The response file preferably looks like this:

```
<make_connection>pending</make_connection>
<connID>ControllerLU/00012</connID>
```

The TSVLU 370 (HDD LU 350) receives this command request and determines the proper sub-device to be used for the connection. Since the command specifies that this is a TSV connection and the TSVLU 370 is the source of this connection, it looks for the TSV Connection ID which links this connection to the recording connection that was made previously. The TSVLU 370 will use this information to determine that the sub-device to be used in this connection is HDD1_Out 354. The connection command preferably looks like this:

```
GET DisplayLUAddr/make_connection<proctype>
?connID=ControllerLU/00008
&owner=ControllerLU
&initiator=ControllerLU
&src=HDDLU
&srcSD=HDD1_Out
&snk=DisplayLU
&srcStreamType=MPEG2
&tsvEnable=yes
&tsvConnID=TunerLU/00007
```

The SnkLU receives the connection request, checkw if a stream type is specified in the command and checkw to see that it is compatible with the specified format. In this example, the SnkLU is compatible with MPEG2. Then the SnkLU needs to determine which sub-device it will use for this connection. In this example, the process is simple since there is only one sub-device to choose from. The SnkLU then checks the SrcLU sub-device for compatibility. It determines that the SrcLU sub-device is an AV/C device and that it knows how to make a connection to this source. It may perform additional checks as necessary at the AV/C level to prepare for the connection. The SnkLU will now make an isochronous connection between the SrcLU sub-device HDD1_Out and the SnkLU sub-device using network level commands as necessary.

Upon a successful connection, the SnkLU 330 creates a results file and the response will be sent to the SrcLU. The response preferably looks like this:

```
<make_connection>succeeded</make_connection>
<connectionInfo>
<connID>ControllerLU/00008</connID>
<owner>ControllerLU<owner>
<initiator>ControllerLU<initiator>
<streamType>MPEG2</streamType>
<source>
    <logical_unit>HDDLU</logical_unit>
    <sub_device>HDD1_Out</sub_device>
</source>
<sink>
    <logical_unit>DisplayLU</logical_unit>
    <sub_device>Monitor</sub_device>
</sink>
<tsvEnable>yes</tsvEnable>
<tsvConnID>TunerLU/00007</tsvConnID>
<recording>no</recording>
</connectionInfo>
```

The SnkLU will generate a Connection Changed Notification to the OLU indicating the status of the connection. The command preferably looks like this:

```
GET <Notification-URL>?operation=ConnChanged
&connID=ControllerLU/00008
&reason=Success
```

The TSVLU 370 has knowledge that it is the source of a TSV connection. Using the TSV Connection ID, it knows the recording track that should be played back on this connection. The TSVLU 370 is preferably required to automatically start playback of the recording track from the beginning.

Restart of TSV Recording: The TV Controller LU 360 knows the start time and duration of the normal recording that is being played back for the TSV playback connection. On or about the expected termination of the normal recording, the TV Controller LU can query the HDD LU 350 for connection status of the recording connection that is related to the TSV playback. If the recording connection is dropped as expected, the TV Controller LU has an opportunity to attempt to restart the TSV recording with the SrcLU and sub-device that the user is viewing. When it is discovered that the connection is dropped, the TV Controller LU issues a connection command to start up the TSV recording from the SrcLU and sub-device that it has been using. The connection command preferably looks like this:

```
GET TunerLUAddr/make_connection<proctype>
?connID=ControllerLU/00009
&owner=ControllerLU
&initiator=ControllerLU
&src=TunerLU
&srcSD=Tuner
&snk=DisplayLU
&tsvEnable=yes
&tsvConnID=ControllerLU/00008
```

The SrcLU will generate a response file to the OLU indicating that the connection is pending. The response file preferably looks like this:
   <make_connection>pending</make_connection>
   <connID>ControllerLU/0009</connID>

In this connection command the specific sub-device is specified to be used as the source. The reason for this is that the TV Controller LU knows that this is the specific sub-device that the user has been viewing while watching the TSV playback of the normal recording. The SrcLU will forward the connection request to the SnkLU 330. This command preferably looks like this:

```
GET TunerLUAddr/make_connection<proctype>
?connID=ControllerLU/00009
&owner=ControllerLU
&initiator=ControllerLU
&src=TunerLU
&srcSD=Tuner
&snk=HDDLU
&srcStreamType=MPEG2
&tsvEnable=yes
&tsvConnID=ControllerLU/00008
```

The SnkLU preferably responds with the following response file:

```
<make_connection>succeeded</make_connection>
<connectionInfo>
<connID>ControllerLU/00009</connID>
<owner>ControllerLU<owner>
<initiator>ControllerLU<initiator>
<streamType>MPEG2</streamType>
<source>
  <logical_unit>TunerLU</logical_unit>
  <sub_device>Tuner</sub_device>
</source>
<sink>
  <logical_unit>HDDLU</logical_unit>
  <sub_device>HDD1_In</sub_device>
</sink>
<tsvEnable>yes</tsvEnable>
<tsvConnID>ControllerLU/00008</tsvConnID>
<recording>no</recording>
</connectionInfo>
```

The SnkLU will preferably generate a Connection Changed Notification to the OLU indicating the status of the connection. The command preferably looks like this:

```
GET <Notification-URL>?operation=ConnChanged
&connID=ControllerLU/00009
&reason=Success
```

The HDD LU 350 will start the TSV recording. This TSV recording connection is being associated with an existing TSV playback connection that is already playing back a different track than the one that will be recorded to. The HDD LU 350 is responsible for determining when the current TSV playback reaches the end of the track at which time it will automatically begin playback of the TSV recording track that has just started recording. When the playback stalls on the normal recording track the HDD LU 350 transitions playback from the normal recording track to the new TSV recording track that the TSV Playback connection has been associated with. The Playback Stalled notification event is not generated by the HDD LU 350 since it has a new track to begin playing from when the playback stalls.

After this TSV recording connection is made and is associated with the TSV playback connection, the HDD LU preferably generates a Connection Changed notification event with the reason Modified and the Connection ID ControllerLU/0008 specified to indicate the new association with the TSV recording connection.

Scenario 7—Source Selection from 3rd Party Controller: In this scenario, the user selects a source LU for viewing on the TV from a web browser in a computer. This is an Immediate Unreserved type of connection initiated by a 3rd party (not the source or sink). For this scenario, a computer is added to the network. It has a controller type LU, CompController, that is invisible to other LUs. For purposes of this scenario, reference is made to the device and LU configuration in FIG. 6 with the exception of the CompController LU.

Step 1—User Selection of Source and Sink: The user accesses the Computer's device selection interface and is presented with a list of source LUs (TuneDev 340 and HDD 350). The user can also select a sink LU (MainTV 330). The user selects the TuneDev as the source and MainTV as the sink.

The Computer CompController LU issues a make_connection request. The request is directed at the SrcLU named TuneDev and specifies the MainTV as the SnkLU 330. The Computer CompController LU is the owner and initiator of this connection request. The Computer issues a command to the TuneDev that preferably includes:

```
GET TunerLUAddr/make_connection<proctype>
?connID=CompCntlLU/00001
&owner=CompCntlLU
&initiator=CompCntlLU
&src=TunerLU
&snk=DisplayLU
```

The SrcLU preferably generates a response file to the OLU indicating that the connection is pending. The response file preferably looks like this:

```
<make_connection>pending</make_connection>
<connID>CompCntlLU/00011</connID>
```

Step 2—Source Connection to Sink: The SrcLU determines which sub-device is available for the connection. In this example, this process is simple since there is only one sub-device to choose from. The SrcLU preferably includes the sub-device information and the source stream type in the connection command and sends the connection request to the SnkLU. The command preferably looks like this:

```
GET DisplayLUAddr/make_connection<proctype>
    ?connID=CompCntlLU/00001
    &owner=CompCntlLU
    &initiator=CompCntlLU
    &src=TunerLU
    &srcSD=Tuner
    &snk=DisplayLU
    &srcStreamType=MPEG2
```

Step 3—Sink LU Makes Connection: The SnkLU receives the connection request and checks if a stream type is specified in the command and that it is compatible with the specified format. In this example, the SnkLU is compatible with MPEG2. Then the SnkLU needs to determines which sub-device it will use for this connection. In this example, the process is simple since there is only one sub-device to choose from. The SnkLU then checks the SrcLU sub-device for compatibility. It determines that the SrcLU sub-device is an AV/C device and that it knows how to make a connection to this source. It may perform additional checks as necessary at the AV/C level to prepare for the connection. The SnkLU then makes an isochronous connection between the SrcLU sub-device and the SnkLU sub-device using commands specific to network protocols as necessary.

Upon a successful connection, the SnkLU creates a results file that is sent to the SrcLU. The response preferably looks like this:

```
<make_connection>succeeded</make_connection>
<connectionInfo>
<connID>CompCntlLU/00011</connID>
<owner>CompCntlLU<owner>
<initiator>CompCntlLU<initiator>
<streamType>MPEG2</streamType>
<source>
  <logical_unit>TunerLU</logical_unit>
  <sub_device>Tuner</sub_device>
</source>
<sink>
  <logical_unit>DisplayLU</logical_unit>
  <sub_device>Monitor</sub_device>
</sink>
<recording>no</recording>
</connectionInfo>
```

The SnkLU preferably generates a Connection Changed Notification to the OLU indicating the status of the connection. The command preferably looks like this:

```
GET <Notification-URL>?operation=ConnChanged
    &connID=CompCntlLU/00011
    &reason=Success
```

Service Banner: The Service Banner can be displayed using similar technique as described in Scenario 1, Service Banner.

Control Frame—The Control Frame can be displayed using similar technique as described in Scenario 1, Control Frame.

Key Initiated UI: The key initiated UI can be displayed using similar technique as described in Scenario 1, Key Initiated UI.

Connection Query: The Connection Query can be performed using similar technique as described in Scenario 1, Connection Query.

Dropping the Connection: The dropping of a connection can be performed using similar technique as described in Scenario 1, Dropping the Connection.

Scenario 8—Connection priority: In this scenario, as depicted in FIG. 12A, the user is presently in a scenario similar to scenario 1 (see FIG. 6) in which the user is watching the Cable Box on the Bedroom TV instead of the Main TV. This connection was carried out in the same manner as the connection in scenario 1 wherein the owner and iniator LU is the BRTV LU 380, the sink LU is the BRTV 370 and the sink subDev is the monitor or display 372. A second user, however, wants to watch a program from the Cable Box on the MainTV.

Step 1—User Selection of Source and Sink: The user accesses the TV's device selection interface and is presented with a list of source LUs (TuneDev 340 and HDD 350). The user can also select a sink LU (MainTV) 330. The user selects the TuneDev 340 as the source and MainTV 330 as the sink. At this point the TV Controller 320 issues a make_connection request directed at the SrcLU named TuneDev 340 and specifies the MainTV 330 as the SnkLU.

Figure 12B:
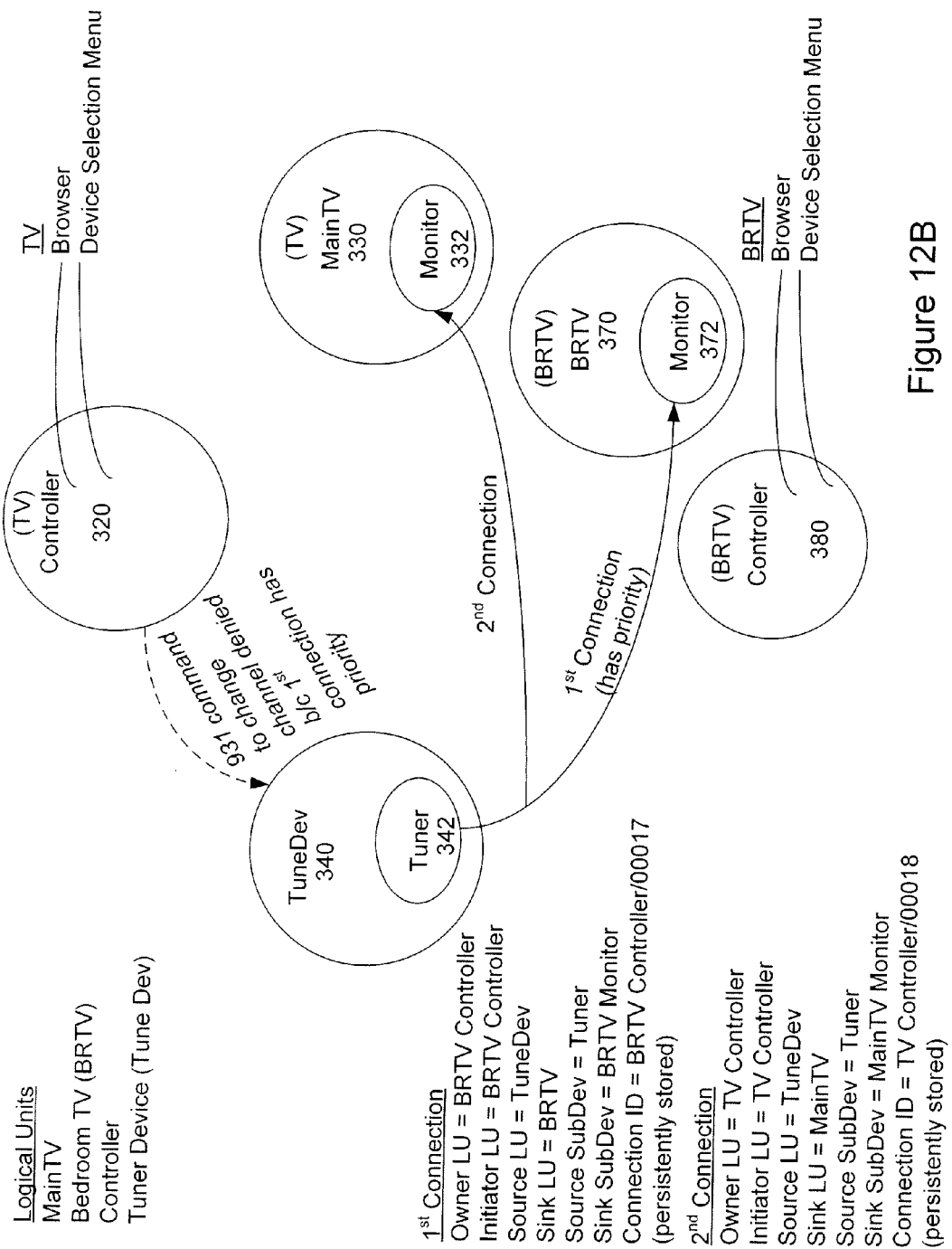

Step 2—Source Connection to Sink: The SrcLU 340 determines which sub-device is available for the connection. In this example, the only sub-device Tuner 342 is unavailable. A notification mechanism is used to indicate to the second user that the cable box is unavailable except for the program the first user is viewing on the BRTV. The second user, as depicted in FIG. 12B, is free to piggy back on the first connection and view the same program on the MainTV.

Step 3—Sink LU Makes Connection: The SnkLU 330 receives the connection request and makes the connection as noted in regard to scenario 1.

Control priority: The connection system preferably provides a mechanism to identify the LUs that are using or are involved in a connection. This information is preferably used as a means to determine if commands defined in CEA931 from LUs should be accepted or rejected. In this example, because the owner of the first connection has the highest priority, any 931 commands to change the channel from the Controller 320 of the MainTV will be denied.

Figure 13:
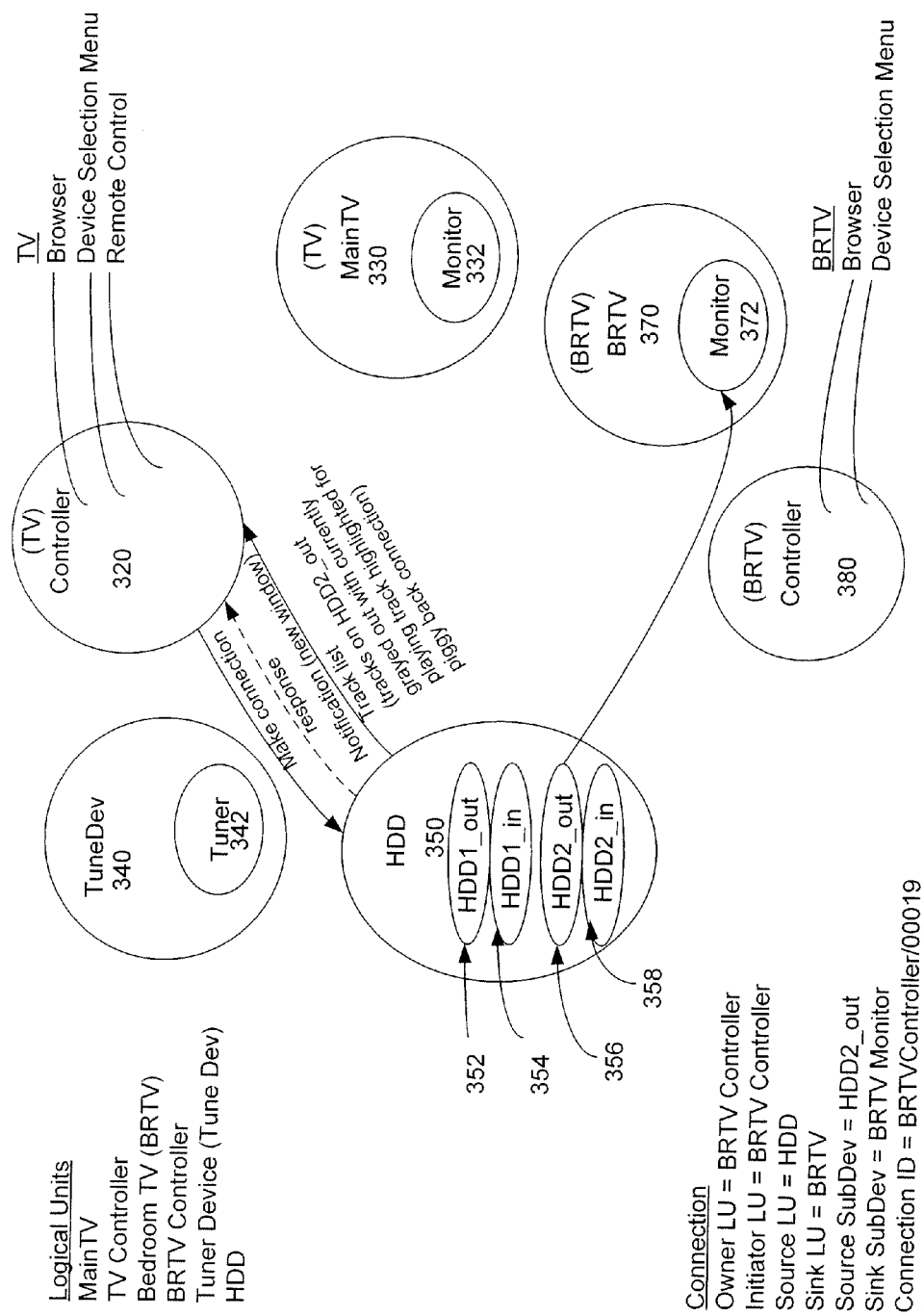
FIG. 13 shows a schematic that illustrates connection priority in accordance with a preferred embodiment.

Scenario 9—Connection priority: In this scenario, as depicted in FIG. 13, the user is presently in a scenario similar to scenario 3 (see FIG. 7) in which the user is watching a the HDD on the Bedroom TV instead of the Main TV. This connection was carried out in the same manner as the connection in scenario 3 wherein the owner and iniator LU is the BRTV LU 380, the sink LU is the BRTV 370 and the sink SubDev is the monitor or display 372. A second user, however, wants to watch a program from the HDD on the MainTV.

Step 1—User Selection of Source and Sink: The second user accesses the TV's device selection interface and is presented with a list of source LUs (TuneDev 340 and HDD 350). The user can also select a sink LU (MainTV) 330. The user selects the HDD 350 as the source and MainTV 330 as the sink. At this point the TV Controller 320 issues a make_connection request directed at the SrcLU named HDD 350 and specifies the MainTV 330 as the SnkLU.

Step 2—Source Connection to Sink: The SrcLU 350 determines which sub-device is available for the connection. In this example, sub-device HDD2_Out is unavailable. A notification mechanism is used to indicate to the second user that the tracks that are on HDD1_Out are available but that the tracks that are on HDD2_Out are unavailable except for the track the first user is viewing on the BRTV. The second user, as similarly depicted in FIG. 12B, is free to piggy back on the first connection and view the same track on the MainTV or select a track from HDD1_Out.

Step 3—Sink LU Makes Connection: The connection is then made in a manner similar to scenario 3.

Control priority: The connection system preferably provides a mechanism to identify the LUs that are using or are involved in a connection. This information is preferably used as a means to determine if commands defined in CEA931 from LUs should be accepted or rejected. In this example, because the owner of the first connection has the highest priority, any 931 commands to select a track on HDD2_Out from the Controller 320 of the MainTV will be denied.

Figure 14:
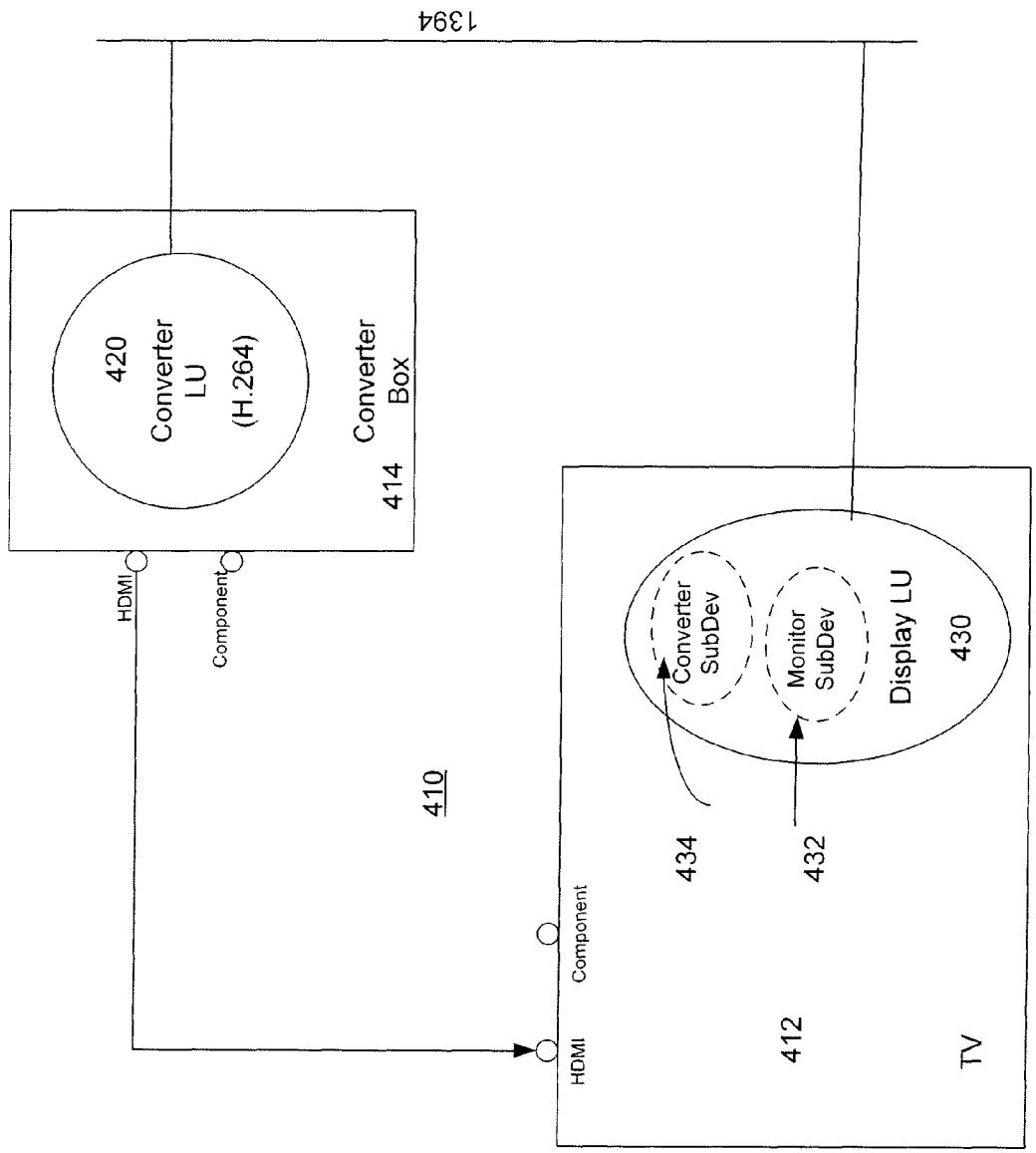
FIG. 14 shows a schematic that illustrates a converter scenario.

Scenario 10—Turning to FIG. 14, implementation of converter profile implementation is depicted. In a network 410 comprising at least a TV 412 and converter box 414, a LU 420 that has the converter profile is designed to become a sub-device of a Sink LU 430 in another device, typically a TV 412. The Converter device 414 will accept one or more AV stream types from the network and convert them for output on a non-network based interface, typically component video or HDMI (or some other uncompressed digital point to point interface). LUs that can use this type of service preferably recognize this profile and to incorporate this service into its own LU. LUs that do not need this type of service will be designed to skip over this profile and will see the LU 420 with the Converter profile as an invisible LU.

An example data file fragment is shown below where the only LU in the device is specifying the Converter profile. The Convert Box 414 is capable of converting H.264 transport streams into component video or HDMI. The Converter box 414 has an AV/C Unit but no subunits. It has one unit level serial bus isochronous input plug and two unit level external output plugs. The input plug preferably accepts MP4 streams from the 1394 network. Preferably, one output plug is capable of component video and the other output plug is capable of HDMI with HDCP. Only one output preferably can be in use at a time.

Inside the Profile tag of all of the sub-device (AV/C unit and plugs) information is defined. Devices that don't support the Converter Profile will skip over everything in this tag. Outside of the Profile tag the sub-device information (SubDevAddrInfo tag) only defines the network, such as the 1394, GUID and AV/C unit. This prevents the AV/C unit in the Converter Box from being proxied for by other devices on the network. The UnitType tag is set to Invisible so other devices will ignore this LU.

```
<logical_unit>
<Profile profileType=Converter>
    <SubDevAddrInfo>
        <SubDevName>CnvH264_In</SubDevName>
        <SubDevType>AVC</SubDevType>
        <SubDevAddr>
<Node>0x073E45780000000A</Node>
<AVCSubUnit>0xFF</AVCSubUnit>
<PlugInfo>
    <plugNum>0x00</plugNum>
    <plugType>ISERIAL</plugType>
    <plugDir>INPUT</plugDir>
</PlugInfo>
        <streamType>H.264</streamType>
        </SubDevAddr>
    </SubDevAddrInfo>
    <SubDevAddrInfo>
        <SubDevName>CnvComp_Out</SubDevName>
        <SubDevType>AVC</SubDevType>
        <SubDevAddr>
<Node>0x073E45780000000A</Node>
<AVCSubUnit>0xF8</AVCSubUnit>
<PlugInfo>
    <plugNum>0x80</plugNum>
    <plugType>EXTERNAL</plugType>
    <plugDir>OUTPUT</plugDir>
</PlugInfo>
        <streamType>Component</streamType>
        </SubDevAddr>
    </SubDevAddrInfo>
    <SubDevAddrInfo>
        <SubDevName>CnvHDMI_Out</SubDevName>
        <SubDevType>AVC</SubDevType>
        <SubDevAddr>
<Node>0x073E45780000000A</Node>
<AVCSubUnit>0xF8</AVCSubUnit>
<PlugInfo>
    <plugNum>0x81</plugNum>
    <plugType>EXTERNAL</plugType>
    <plugDir>OUTPUT</plugDir>
</PlugInfo>
        <streamType>HDMI</streamType>
        </SubDevAddr>
    </SubDevAddrInfo>
</Profile>
<Manufacturer>XYZ Corp</Manufacturer>
<PortNo>8080</PortNo>
<Procedures>.cgi</Procedures>
<SubDevAddrInfo>
    <SubDevName>DummyDev</SubDevName>
    <SubDevType>AVC</SubDevType>
    <SubDevAddr>
<Node>0x073E45780000000A</Node>
<AVCSubUnit>0xF8</AVCSubUnit>
    </SubDevAddr>
</SubDevAddrInfo>
<UnitName>MP4 Converter</UnitName>
<UnitType>NotVisible</UnitType>
<CEA931commands>
</CEA931commands>
</logical_unit>
```

Any LU that supports the Converter profile can take possession of this converter LU and include its network oriented sub-device information with its own sub-device information to form an updated LU. Before presenting any UI to the user, the LU that wants to possibly use the Converter sub-device preferably scans the list of devices to insure that the Converter networked sub-device is not already included as a sub-device of another LU. Once verified, the LU may move forward with the process. Prior to taking possession of this LU, the TV may want to provide a screen to the user where the TV Input can be specified for the connection of the Converter Box. The stream types specified for the each sub-device (external output plug type of sub-device) of the Converter LU can be used to provide a list of acceptable inputs to the user.

Shown below is an example data file fragment showing a simple Sink LU inside a TV including the Converter sub-device information in its LU.

```
<logical_unit>
<Manufacturer>ABC Corp</Manufacturer>
<PortNo>8080</PortNo>
<Procedures>.cgi</Procedures>
<SubDevAddrInfo>
    <SubDevName>Monitor</SubDevName>
    <SubDevType>AVC</SubDevType>
    <SubDevAddr>
<Node>0xFE0158BC12345678</Node>
<AVCSubUnit>0x00</AVCSubUnit>
<PlugInfo>
    <plugNum>0x00</plugNum>
```

```
                <plugType>Input</plugType>
                <plugDir>Destination</plugDir>
            </PlugInfo>
        </SubDevAddr>
    </SubDevAddrInfo>
    <SubDevAddrInfo>
        <SubDevName>CnvH264_In</SubDevName>
        <SubDevType>AVC</SubDevType>
        <SubDevAddr>
<Node>0x073E45780000000A</Node>
<AVCSubUnit>0xFF</AVCSubUnit>
<PlugInfo>
                <plugNum>0x00</plugNum>
                <plugType>ISERIAL</plugType>
                <plugDir>INPUT</plugDir>
        </PlugInfo>
        </SubDevAddr>
    </SubDevAddrInfo>
    <UnitName>MainTV</UnitName>
    <UnitType>SinkOnly</UnitType>
    <CEA931commands>
    </CEA931commands>
</logical_unit>
```

Preferably only the network input sub-device from the Converter Box LU is included in this data file fragment for the TV. This TV LU is responsible for handling the internal connection inside the Converter AV/C unit when it is used in a connection. The AV/C CONNECT command is used for this internal connection from the isochronous serial input plug to either of the external output plugs.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed:

1. In a method of connecting devices within a digital network of devices wherein the services and functions of the devices and sub-devices of the devices are represented as a plurality of logical units and wherein the logical units comprise one or more logical units that represent the services and control the functions of a single physical device, one or more logical units that represent the services and control the functions of one or more sub-devices of a single physical device, one or more logical units that represent the services and control the functions of a sub-device of a single physical device, and one or more logical units that represent the services and control the functions of a plurality of sub-devices of more than one physical device, the improvement comprising the steps of presenting a list of source logical units from the plurality of logical units to a user, communicating a connection request from a control logical unit to a first logical unit selected by the user to be a source logical unit of a connection, the request including an identification of a second logical unit selected by the user to be a sink logical unit of the connection, wherein the source logical unit controls a plurality of source sub-devices comprising more than one sub-device of a single physical device or a plurality of sub-devices of more than one physical device, and wherein the sink logical unit controls a plurality of sink sub-devices comprising more than one sub-device of a single physical device or a plurality of sub-devices of more than one physical device, identifying a source sub-device for connection to a sink sub-device, wherein the source logical unit determines which of the plurality of source sub-devices it controls is available for connection to a sink sub-device, appending the identity of the source sub-device determined to be available for connection to a sink sub-device to the connection request, communicating the connection request from the source logical unit to the sink logical unit, identifying a sink sub-device for connection to the source sub-device determined to be available for connection to the sink sub-device, wherein the sink logical unit determines which of the plurality of sink sub-devices it controls is available for connection to a source sub-device determined to be available for connection to a sink sub-device, and connecting the source sub-device determined to be available for connection to a sink sub-device to the sink sub-device determined to be available for connection to a source sub-device.

2. The method of claim 1 further comprises a step of presenting a list of sink logical units.

3. The method of claim 1 wherein the step of presenting a list of sink logical units includes presenting a graphical user interface.

4. The method of claim 1 wherein the steps of communicating include communicating using an IP that is independent of an underlying network protocol.

5. The method of claim 4 wherein the IP is a web based protocol.

6. The method of claim 1 wherein the steps of communicating include communicating over a medium that is separate from medium over which the devices are linked.

7. The method of claim 1 further comprising the step of assigning a connection ID to the connection.

8. The method of claim 7 further comprising the step of storing the connection ID in persistent memory.

9. The method of claim 1 wherein the step of determining the available source sub-device includes issuing a notification to the user to resolve an ambiguity.

10. The method of claim 9 wherein the notification includes a program guide associated with the source sub-devices.

11. The method of claim 9 wherein the notification includes a track list associated with the source sub-devices.

12. The method of claim 1 further comprising the step of creating and storing a results file upon successful connection.

13. The method of claim 12 wherein the results file includes a unique connection ID and an identification of the logical unit that owns the connection.

14. The method of claim 13 wherein the results file further identifies a connection initiator logical unit, the logical unit, the logical unit, the sub-device and the sub-device.

15. The method of claim 13 further comprising the steps of communicating a request to display a service banner of the source sub-device on the sink sub-device from the control logical unit to the source logical unit, and identifying the service banner to be displayed using the unique connection ID.

16. The method of claim 13 further comprising the steps of communicating a request to display a control panel of the source sub-device on the sink sub-device from the control logical unit to the source logical unit, and identifying the control panel to be displayed using the unique connection ID.

17. The method of claim 13 further comprising the step of preventing a logical unit that is not the owner of the connection from altering the connection.

18. A method of reserving a connection between devices within a digital network of devices wherein the services and functions of the devices and sub-devices of the devices are represented as a plurality of logical units and wherein the logical units comprise one or more logical units that represent the services and control the functions of a single physical device, one or more logical units that represent the services and control the functions of one or more sub-devices of a single physical device, one or more logical units that represent the services and control the functions of a sub-device of a single physical device, and one or more logical units that represent the services and control the functions of a plurality of sub-devices of more than one physical device, comprising the steps of communicating a request for a reservation from a source logical unit to a sink logical unit, wherein the source logical unit controls a plurality of source sub-devices comprising more than one sub-device of a single physical device or a plurality of sub-devices of more than one physical device, and the sink logical unit controls a plurality of sink sub-devices comprising more than one sub-device of a single physical device or a plurality of sub-devices of more than one physical device, checking the reservation of the request for a reservation for conflicts wherein the sink logical unit checks the request for a reservation against reservations stored in its reservation database, each reservation stored in the reservation database is assigned a unique reservation ID, assigning a first reservation ID to the reservation of the request for a reservation, communicating a request for a connection having a second reservation ID from the source logical unit to the sink logical unit, comparing the second reservation ID in the connection request with the reservation IDs of reservations stored in the reservation database of the sink logical unit, and making a connection if the second reservation ID in the connection request matches one of the reservation IDs of reservations stored in the reservation database of the sink logical unit.

19. In a method for time shift viewing (TSV) within a digital network of devices wherein the services and functions of the devices and sub-devices of the devices are represented as a plurality of logical units and wherein the logical units comprise one or more logical units that represent the services and control the functions of a single physical device, one or more logical units that represent the services and control the functions of one or more sub-devices of a single physical device, one or more logical units that represent the services and control the functions of a sub-device of a single physical device, and one or more logical units that represent the services and control the functions of a plurality of sub-devices of more than one physical device, the improvement comprising the steps of presenting a list of source and sink logical units from the plurality of logical units to a user, identifying a logical unit that supports TSV, communicating a first connection request from a control logical unit to a first logical unit selected by the user to be a first source logical unit of a first connection, the request including an identification of a TSV logical unit to be a first sink logical unit in a first leg of a TSV connection, wherein the first source logical unit controls a plurality of source sub-devices comprising more than one sub-device of a single physical device or a plurality of sub-devices of more than one physical device, and wherein the TSV logical unit identified to be the first sink logical unit controls a plurality of sink sub-devices comprising more than one sub-device of a single physical device or a plurality of sub-devices of more than one physical device, identifying a source sub-device to be used in the first leg of the TSV connection, wherein the first source logical unit determines which of the plurality of source sub-devices it controls is available for connection in the first leg of the TSV connection, appending the identity of the source sub-device determined to be available for connection in the first leg of the TSV connection to the connection request, communicating the first connection request from the first source logical unit to the TSV logical unit, identifying a TSV sink sub-device for connection to the source sub-device determined to be available for connection in the first leg of the TSV connection, wherein the TSV logical unit determines which of the plurality of sink sub-device it controls is available for connection to the source sub-device determined to be available for connection in the first leg of the TSV connection, connecting the source sub-device determined to be available for connection in the first leg of the TSV connection to the TSV sink sub-device determined to be available for connection to the source sub-device determined to be available for connection in the first leg of the TSV connection, assigning a first TSV connection ID to the first leg of the TSV connection, communicating a second connection request from the control logical unit to the TSV logical unit to be a second source logical unit of a second connection, the request identifying a second logical unit to be a second sink logical unit in a second leg of the TSV connection and identifying the connection of the first leg of the TSV connection, wherein the TSV logical unit controls a plurality of source sub-devices comprising more than one sub-device of a single physical device or a plurality of sub-devices of more than one physical device, and wherein and the second sink logical unit controls a plurality of sink sub-devices comprising more than one sub-device of a single physical device or a plurality of sub-devices of more than one physical device, and wherein, identifying a source sub-device to be used in the second leg of the TSV connection, wherein the TSV logical unit determines which of the plurality of source sub-devices it controls is available for connection in the second leg of the TSV connection, appending the identity of the source sub-device determined to be available for connection in the second leg of the TSV connection to the second connection request, communicating the second connection request from the TSV logical unit to the second sink logical unit, identifying a sink sub-device for connection to the source sub-device determined to be available for connection in the second leg of the TSV connection, wherein the second sink logical unit determines which of the plurality of sink sub-devices it controls is available for connection to the source sub-device determined to be available for connection in the second leg of the TSV connection, connecting the source sub-device determined to be available for connection in the second leg of the TSV connection to the sink sub-device determined to be available for connection to the source sub-device determined to be available for connection in the second leg of the TSV connection.

20. A method for a sink logical unit taking possession of a converter logical unit within a digital network of devices wherein the services and functions of the devices and sub-devices of the devices are represented as a plurality of logical units and wherein the logical units comprise one or more logical units that represent the services and control the functions of a single physical device, one or more logical units that represent the services and control the functions of one or more sub-devices of a single physical device, one or more logical units that represent the services and control the functions of a sub-device of a single physical device, and one or more logical units that represent the services and control the functions of a plurality of sub-devices of more than one physical device, comprising the steps of scanning a list of devices to insure that a converter networked sub-device is not already included as a sub-device of one of the plurality of logical units, and taking possession of the converter logical unit and including the converter networked sub-device information as part of the sink logical unit's sub-device information to form an updated sink logical unit.

21. The method of claim 20, further comprising a step of setting a unit type tag to invisible.

\* \* \* \* \*